(12) United States Patent
Ue et al.

(10) Patent No.: US 11,515,826 B2
(45) Date of Patent: Nov. 29, 2022

(54) MOTOR DRIVE CONTROL DEVICE, MOTOR SYSTEM, AND AIR BLOWING DEVICE

(71) Applicant: NIDEC CORPORATION, Kyoto (JP)

(72) Inventors: Kazumasa Ue, Kyoto (JP); Kazuya Matsuzaki, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 474 days.

(21) Appl. No.: 16/787,030

(22) Filed: Feb. 11, 2020

(65) Prior Publication Data

US 2020/0304053 A1 Sep. 24, 2020

(30) Foreign Application Priority Data

Mar. 22, 2019 (JP) .............................. JP2019-055327

(51) Int. Cl.
*G05B 11/28* (2006.01)
*H02P 27/08* (2006.01)
*F04D 25/06* (2006.01)
*H02M 7/5387* (2007.01)

(52) U.S. Cl.
CPC .............. *H02P 27/08* (2013.01); *F04D 25/06* (2013.01); *H02M 7/53871* (2013.01)

(58) Field of Classification Search
CPC .......... H02P 6/085; H02P 27/08; H02P 27/06; F04D 25/06; H02M 7/53871
See application file for complete search history.

(56) References Cited

FOREIGN PATENT DOCUMENTS

CN 105577056 A * 5/2016 .......... H02P 21/0089
JP H09261974 10/1997

* cited by examiner

*Primary Examiner* — Karen Masih
(74) *Attorney, Agent, or Firm* — JCIPRNET

(57) ABSTRACT

A motor drive control device controls driving of a motor by performing PWM control of turning on-off of an arm switching element of a PWM inverter outputting a three-phase AC voltage to the motor, and detects current values of respective phases of the three-phase AC voltage. The motor drive control device turns off a lower arm switching element for a largest phase by causing a first PWM pulse based on a largest phase voltage command and a carrier signal throughout an entire first period during which the carrier signal rises or falls to be at a low level. The motor drive control device turns on a lower arm switching element for a smallest phase by causing a second PWM pulse based on a smallest phase voltage command and the carrier signal throughout an entire second period during which the carrier signal rises or falls to be at a high level.

13 Claims, 14 Drawing Sheets

| Sx | Sy | Sz | Idc |
|---|---|---|---|
| Low | Low | Low | 0 |
| Low | High | High | Iu |
| Low | Low | High | -Iw |
| High | Low | High | Iv |
| High | Low | Low | -Iu |
| High | High | Low | Iw |
| Low | High | Low | -Iv |
| High | High | High | 0 |

MOTOR DRIVE CONTROL DEVICE, MOTOR SYSTEM, AND AIR BLOWING DEVICE

CROSS-REFERENCE TO RELATED APPLICATION

This application claims the priority benefit of Japan Patent Application No. 2019-055327, filed on Mar. 22, 2019. The entirety of the above-mentioned patent application is hereby incorporated by reference herein and made a part of this specification.

BACKGROUND

Technical Field

The disclosure relates to a motor drive control device, a motor system, and an air blowing device.

Description of Related Art

In the related art, devices performing PWM control of a motor driven using a three-phase AC voltage output from an inverter are known. In the related art, control devices having an inverter circuit in which two transistors connected in series are connected in parallel in three rows are used, and these control devices perform A/D conversion of phase currents of respective phases in a three-phase AC voltage output from the inverter circuit to the motor and detect the converted currents in order to correct a current error between a phase current command value and an actual phase current value. The control device outputs phase voltage commands for the respective phases of a three-phase AC voltage output to the motor in accordance with a current error of a current command based on detection results of the phase currents.

In detection of phase currents as in the related art, different phase currents can be detected in accordance with a combination of turning on a low voltage side transistor in each of the rows constituted of two transistors connected in parallel. Therefore, since a current error is obtained every cycle of a carrier signal used for PMW control, at least two different phase currents are detected and are subjected to A/D conversion.

Here, in PWM control, in a PWM pulse output to each of the transistors of the inverter circuit, a detection signal immediately after a rising edge sometimes becomes unstable depending on the constitution of a detection circuit. Therefore, when different phase currents are detected, it is necessary to devise a way of detecting phase currents and performing A/D conversion thereof in a timely manner during a short period of time excluding the rising edge within a pulse width in a transistor to be turned on.

However, if time intervals of the rising edges in the respective transistors to be turned on become closer, there is concern that a time for detecting phase currents may not be able to be ensured. For example, in a sinusoidal three-phase AC voltage, since a difference between a V-phase voltage value and a W-phase voltage value decreases before and after a time at which a U-phase voltage value becomes the largest, there is concern that a time for detecting phase currents other than that of a U-phase may not be able to be ensured.

SUMMARY

According to an aspect of the disclosure, there is provided a motor drive control device controlling driving of a motor using a PWM inverter outputting a three-phase AC voltage to the motor and detecting current values of respective phases of the three-phase AC voltage by controlling turning on-off of an upper arm switching element and a lower arm switching element of the PWM inverter using a PWM pulse. The motor drive control device includes a phase voltage command part which outputs phase voltage commands for the respective phases of the three-phase AC voltage, and a PWM control part which generates the PWM pulse based on a carrier signal cyclically repeating rising and falling and the phase voltage commands. The PWM control part generates a first PWM pulse based on a largest phase voltage command, of the phase voltage commands, for a largest phase having a largest phase voltage command value, and the carrier signal. Moreover, the PWM control part causes the first PWM pulse to be at a level for turning off the lower arm switching element for the largest phase throughout an entire first period that is one of a rising period and a falling period of the carrier signal. In addition, the PWM control part generates a second PWM pulse based on a smallest phase voltage command, of the phase voltage commands, for a smallest phase having a smallest phase voltage command value, and the carrier signal, and causes the second PWM pulse to be at a level for turning on the lower arm switching element for the smallest phase throughout an entire second period that is one of the rising period and the falling period of the carrier signal.

According to another aspect of the disclosure, there is provided a motor system including a motor to which a three-phase AC voltage is applied by a PWM inverter, and the motor drive control device which controls driving of the motor using the PWM inverter and detects current values of respective phases of the three-phase AC voltage by controlling turning on-off of an upper arm switching element and a lower arm switching element of the PWM inverter using a PWM pulse.

According to still another aspect of the disclosure, there is provided an air blowing device including an impeller which has a vane rotatable about a central axis extending in an up-down direction, a motor which rotates the vane, a PWM inverter which outputs a three-phase AC voltage to the motor, and the motor drive control device which controls driving of the motor using the PWM inverter and detects current values of respective phases of the three-phase AC voltage by controlling turning on-off of an upper arm switching element and a lower arm switching element of the PWM inverter using a PWM pulse.

DESCRIPTION OF THE EMBODIMENT

Hereinafter, an exemplary embodiment of the disclosure will be described with reference to the drawings.

In this specification, each of a U-phase voltage Vu, a V-phase voltage Vv, and a W-phase voltage Vw of a three-phase AC voltage, or a generic term thereof is referred to as a phase voltage sometimes. In addition, each of a U-phase current Iu, a V-phase current Iv, and a W-phase current Iw of a three-phase AC voltage, or a generic term thereof is referred to as a phase current sometimes. Regarding polarities of a phase current, the polarity of a phase current in a direction flowing into a neutral point 23 from each of terminals 24u, 24v, and 24w of a motor 2 is regarded as a positive pole, and the polarity of a phase current in a direction flowing out from the neutral point 23 is regarded as a negative pole.

In addition, in a predetermined phase θ, a phase, of respective phases of a three-phase AC voltage having a U-phase, a V-phase, and a W-phase, having a largest phase voltage command value is referred to as a largest phase, a phase having a smallest phase voltage command value is referred to as a smallest phase, and a phase having a phase voltage command value smaller than that of the largest phase and larger than that of the smallest phase is referred to as an intermediate phase. A phase voltage command for the largest phase is referred to as a largest phase voltage command, a phase voltage command for the smallest phase is referred to as a smallest phase voltage command, and a phase voltage command for the intermediate phase is referred to as an intermediate phase voltage command. In addition, a phase voltage command for the U-phase of a three-phase AC voltage is referred to as a U-phase voltage command Vu_ref, a phase voltage command for the V-phase is referred to as a V-phase voltage command Vv_ref, and a phase voltage command for the W-phase is referred to as a W-phase voltage command Vw_ref. Moreover, a generic term thereof is referred to as a phase voltage command sometimes.

Regarding a carrier signal Cs, a period during which a value of the carrier signal Cs increases and a duration thereof are referred to as a rising period TLup, and a period during which the value of the carrier signal Cs decreases and a duration thereof are referred to as a falling period TLdown.

1. Embodiment

<1-1. Constitution of Air Blowing Device>

Figure 1A:
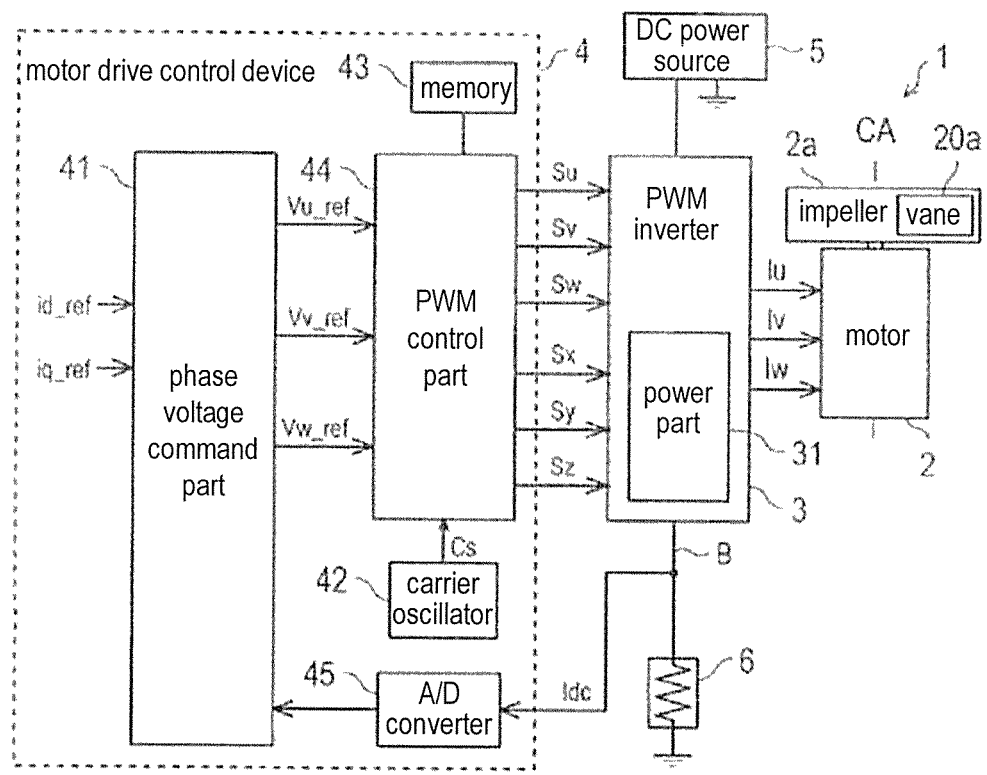
FIG. 1A is a block diagram illustrating a constitutive example of an air blowing device.
Figure 1B:
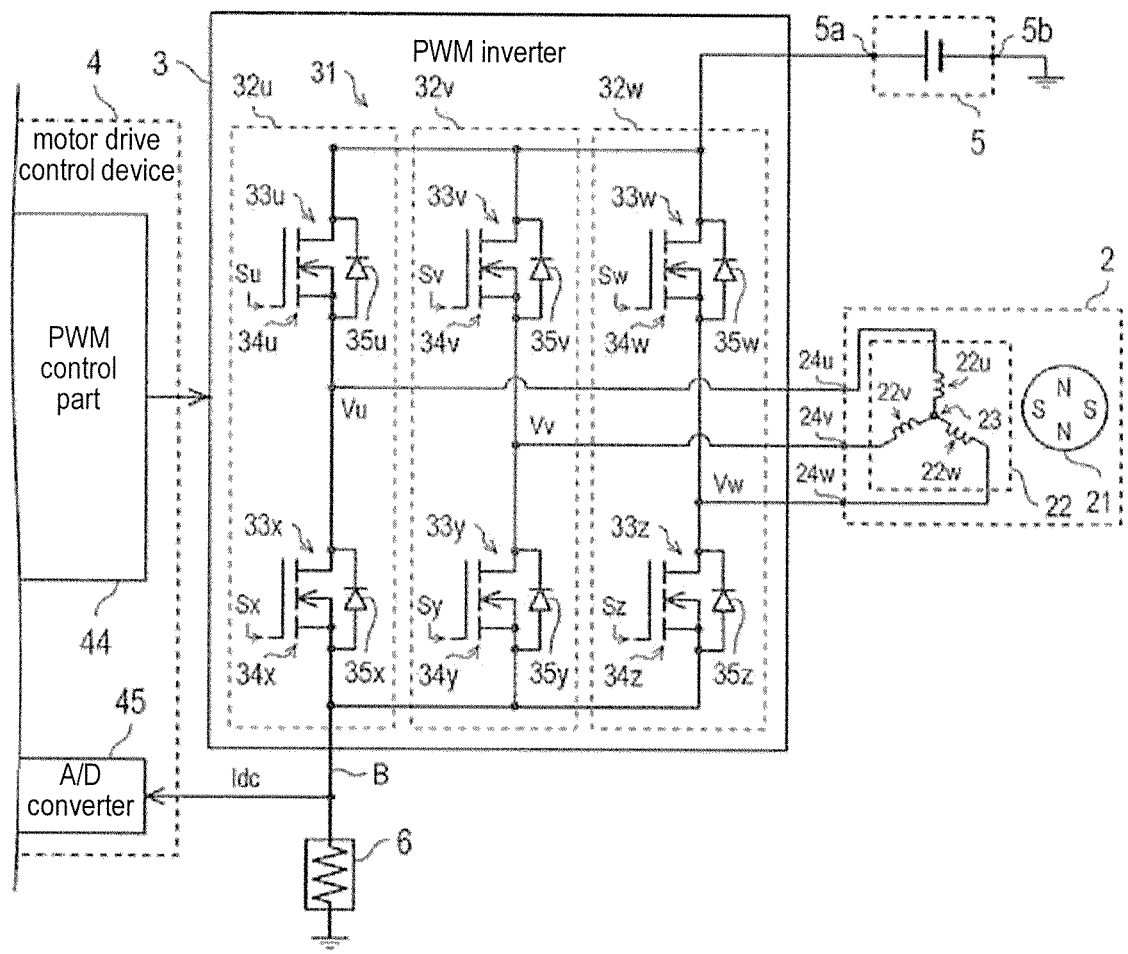
FIG. 1B is a circuit diagram illustrating a constitutive example of a part of the air blowing device.

FIG. 1A is a block diagram illustrating a constitutive example of an air blowing device 1. FIG. 1B is a circuit diagram illustrating a constitutive example of a part of the air blowing device 1. The air blowing device 1 is an example of a motor drive control system and includes an impeller 2a, the motor 2, a PWM inverter 3 having a power part 31, a motor drive control device 4, a DC power source 5, and a shunt resistor 6.

The impeller 2a is attached to the motor 2 and can rotate in accordance with driving of the motor 2. The impeller 2a has a vane 20a which is rotatable about a central axis CA extending in an up-down direction.

The motor 2 rotates the vane 20a of the impeller 2a. A three-phase AC voltage is applied to the motor 2 by the PWM inverter 3. For example, the motor 2 is a three-phase brushless DC motor (BLDC motor). More specifically, as illustrated in FIG. 1B, the motor 2 includes a rotor 21 and a stator 22. A permanent magnet is provided in the rotor 21. A U-phase armature winding 22u, a V-phase armature winding 22v, and a W-phase armature winding 22w are provided in the stator 22. The armature windings (22u, 22v, and 22w) are subjected to Y-connection about the neutral point 23. In the armature windings (22u, 22v, and 22w), non-connection ends on a side opposite to the neutral point 23 are respectively connected to terminals (24u, 24v, and 24w). In the motor 2, a current flowing in the armature winding 22u is the U-phase current Iu, a current flowing in the armature winding 22v is the V-phase current Iv, and a current flowing in the armature winding 22w is the W-phase current Iw.

The PWM inverter 3 outputs a three-phase AC voltage to the motor 2. A constitution of the PWM inverter 3 will be described below.

The motor drive control device 4 controls turning on-off of upper arm switching elements (34u, 34v, and 34w) and lower arm switching elements (34x, 34y, and 34z) (which will be described below) of the PWM inverter 3 using PWM pulses (Su, Sv, Sw, Sx, Sy, and Sz). Accordingly, the motor drive control device 4 controls driving of the motor 2 using the PWM inverter 3. In addition, the motor drive control device 4 detects current values (Iu, Iv, and Iw) of the respective phases of a three-phase AC voltage. A constitution of the motor drive control device 4 will be described below.

As illustrated in FIG. 1B, the DC power source 5 has a negative output terminal 5b on a low voltage side and outputs a DC voltage between a positive output terminal 5a and the negative output terminal 5b. The positive output terminal 5a is connected to the power part 31 of the PWM inverter 3 and is earthed to the negative output terminal 5b.

The shunt resistor 6 is a current detection resistor used for detecting a current flowing at a low voltage side end of the power part 31 of the PWM inverter 3. One end of the shunt resistor 6 is connected to the low voltage side end of the power part 31 in series via a bus B. The other end of the shunt resistor 6 is earthed. In addition, the bus B between the one end of the shunt resistor 6 and the power part 31 connected in series is connected to an A/D converter 45 (which will be described below) of the motor drive control device 4. Accordingly, a current flowing at the low voltage side end of the power part 31 is input to the motor drive control device 4 as a detection current Idc.

In addition, the air blowing device 1 may have a motor unit including the motor 2 and the motor drive control device 4. This motor unit may further include at least any of the PWM inverter 3, the DC power source 5, and the shunt resistor 6.

<1-2. Constitution of PWM Inverter>

Next, with reference to FIGS. 1A and 1B, a constitution of the PWM inverter 3 will be described. As described above, the PWM inverter 3 includes the power part 31. The power part 31 includes a leg 32u for the U-phase, a leg 32v for the V-phase, and a leg 32w for the W-phase. The legs (32u, 32v, and 32w) are connected to each other in parallel. The legs (32u, 32v, and 32w) are half-bridge circuits respectively having upper arm switches (33u, 33v, and 33w) on a high voltage side and lower arm switches (33x, 33y, and 33z) on the low voltage side. In the respective legs (32u, 32v, and 32w), the upper arm switches (33u, 33v, and 33w) and the lower arm switches (33x, 33y, and 33z) on the low voltage side are connected to each other in series.

A high voltage side end of each of the legs (32u, 32v, and 32w) is connected to the positive output terminal 5a of the DC power source 5. Therefore, a DC voltage from the DC power source 5 is applied to each of the legs (32u, 32v, and 32w). The low voltage side end of each of the legs (32u, 32v, and 32w) is connected to the shunt resistor 6 and the A/D converter 45 of the motor drive control device 4 via the bus B.

The upper arm switches (33u, 33v, and 33w) respectively have the upper arm switching elements (34u, 34v, and 34w) and diodes (35u, 35v, and 35w). In addition, the lower arm switches (33x, 33y, and 33z) respectively have the lower arm switching elements (34x, 34y, and 34z) and diodes (35x, 35y, and 35z).

In the present embodiment, field effect transistors (FETs) are used as the upper arm switching elements (34u, 34v, and 34w) and the lower arm switching elements (34x, 34y, and 34z). However, the present embodiment is not limited to this example. For example, other transistors such as insulated-gate bipolar transistors (IGBTs) may be used.

The diodes (35u, 35v, and 35w) are respectively connected to the upper arm switching elements (34u, 34v, and 34w) in parallel having a direction from the low voltage side toward the high voltage side of the DC power source 5 as a forward direction. The diodes (35x, 35y, and 35z) are respectively connected to the lower arm switching elements (34x, 34y, and 34z) in parallel having a direction from the low voltage side toward the high voltage side of the DC power source 5 as a forward direction. For example, a cathode of the diode 35u is connected to the high voltage side end of the upper arm switching element 34u. An anode of the diode 35u is connected to the low voltage side end of the upper arm switching element 34u. Since the other diodes (35v, 35w, 35x, 35y, and 35z) are also connected in a similar manner, description thereof will be omitted. Each of the diodes (35u, 35v, 35w, 35x, 35y, and 35z) functions as a reflux diode (free wheel diode).

In the respective legs (32u, 32v, and 32w), connection points between the upper arm switches (33u, 33v, and 33w) and the lower arm switches (33x, 33y, and 33z) connected in series are respectively connected to the terminals (24u, 24v, and 24w) of the motor 2. For example, in the leg 32u, the connection point between the upper arm switch 33u and the lower arm switch 33x is connected to the terminal 24u of the motor 2. Similarly, in the leg 32v, the connection point between the upper arm switch 33v and the lower arm switch 33y is connected to the terminal 24v of the motor 2. In the leg 32w, the connection point between the upper arm switch 33w and the lower arm switch 33z is connected to the terminal 24w of the motor 2.

<1-3. Constitution of Motor Drive Control Device>

Next, with reference to FIGS. 1A and 1B, a constitution of the motor drive control device 4 will be described. The motor drive control device 4 generates the PWM pulses (Su, Sv, Sw, Sx, Sy, and Sz) that are pulse width modulation signals for the respective phases of a three-phase AC voltage having the U-phase, the V-phase, and the W-phase and outputs the generated PWM pulses to the PWM inverter 3. The motor drive control device 4 controls turning on-off of the upper arm switching elements (34u, 34v, and 34w) and the lower arm switching elements (34x, 34y, and 34z) of the PWM inverter 3 using the PWM pulses (Su, Sv, Sw, Sx, Sy, and Sz). Accordingly, the motor drive control device 4 controls driving of the motor 2 using the PWM inverter 3 outputting a three-phase AC voltage to the motor 2. In addition, the motor drive control device 4 detects current values of the respective phases of a three-phase AC voltage and adjusts each of the PWM pulses (Su, Sv, Sw, Sx, Sy, and Sz) based on a detection result thereof. For example, the motor drive control device 4 is constituted of a microcomputer or the like having a central processing unit (CPU).

The motor drive control device 4 has a phase voltage command part 41, a carrier oscillator 42, a memory 43, a PWM control part 44, and the A/D converter 45.

The phase voltage command part 41 generates the U-phase voltage command Vu_ref, the V-phase voltage command Vv_ref, and the W-phase voltage command Vw_ref as the phase voltage commands for the respective phases of a three-phase AC voltage and outputs the generated phase voltage commands to the PWM control part 44. These phase voltage commands (Vu_ref, Vv_ref, and Vw_ref) indicate voltages (voltage values) to be followed by the respective phase voltages (Vu, Vv, and Vw). That is, the U-phase voltage command Vu_ref indicates a voltage (voltage value) to be followed by the U-phase voltage Vu. The V-phase voltage command Vv_ref indicates a voltage (voltage value) to be followed by the V-phase voltage Vv. The W-phase voltage command Vw_ref indicates a voltage (voltage value) to be followed by the W-phase voltage Vw. In the present embodiment, the phase voltage commands (Vu_ref, Vv_ref, and Vw_ref) are voltage signals having voltages (voltage values) to be followed by the respective phase voltages (Vu, Vv, and Vw). However, the embodiment is not limited to this example. Each of the phase voltages (Vu, Vv, and Vw) may be a digital signal indicating a voltage (voltage value) to be followed.

The phase voltage command part 41 generates and outputs the phase voltage commands (Vu_ref, Vv_ref, and Vw_ref) for the respective phases of a three-phase AC voltage for causing currents corresponding to dual-axis current commands id_ref and iq_ref to flow to the motor 2. Here, the detection current Idc input from the bus B to the motor drive control device 4 is subjected to A/D conversion by the A/D converter 45 and is input to the phase voltage command part 41 thereafter. The phase voltage command part 41 detects actual current values (Iu, Iv, and Iw) of the respective phases of a three-phase AC voltage based on the detection current Idc after being subjected to A/D conversion. The phase voltage command part 41 generates the phase voltage commands (Vu_ref, Vv_ref, and Vw_ref) for the respective phases of a three-phase AC voltage based on the actually detected current values (Iu, Iv, and Iw) of the respective phases and the dual-axis current commands id_ref and iq_ref.

The carrier oscillator 42 generates the carrier signal Cs cyclically repeating rising and falling and outputs the generated carrier signal Cs to the PWM control part 44. For example, the carrier signal Cs is a voltage signal cyclically repeating rising and falling of a voltage and is a triangular wave in the present embodiment. The embodiment is not limited to this example. The carrier signal Cs may be a digital signal indicating a value repeating counting up and counting down. In the present embodiment, the rising period TLup during which the value of the carrier signal Cs increases has the same duration as the falling period TLdown during which the value of the carrier signal Cs decreases. In the present embodiment, the carrier oscillator 42 is provided in the motor drive control device 4. However, the embodiment is not limited to this example. The carrier oscillator 42 may be provided outside the motor drive control device 4. That is, the carrier signal Cs may be input to the motor drive control device 4 from the outside.

The memory 43 is a non-transitory storage medium which retains stored contents even after power supply stops. The memory 43 stores information and a program to be utilized for each of the constituent elements of the motor drive control device 4 and particularly stores information and a program to be utilized for the phase voltage command part 41 and the PWM control part 44.

The PWM control part 44 performs PWM control of the PWM inverter 3 based on the phase voltage commands (Vu_ref, Vv_ref, and Vw_ref). That is, the PWM control part 44 generates the PWM pulses (Su, Sv, Sw, Sx, Sy, and Sz) based on the carrier signal Cs cyclically repeating rising and falling and the phase voltage commands (Vu_ref, Vv_ref, and Vw_ref). The PWM control part 44 outputs the PWM pulses (Su, Sv, and Sw) to respective control terminals such as gates or bases in the upper arm switching elements (34*u*, 34*v*, and 34*w*). In addition, the PWM control part 44 outputs the PWM pulses (Sx, Sy, and Sz) to respective control terminals such as gates or bases in the lower arm switching elements (34*x*, 34*y*, and 34*z*). Accordingly, turning on-off of the upper arm switches (33*u*, 33*v*, and 33*w*) and the lower arm switches (33*x*, 33*y*, and 33*z*) can be switched. That is, an on-state (electrified) and an off-state (not electrified) of each of the upper arm switching elements (34*u*, 34*v*, and 34*w*) and each of the lower arm switching elements (34*x*, 34*y*, and 34*z*) can be switched. In addition, when the PWM pulses (Su, Sv, Sw, Sx, Sy, and Sz) are generated, in order to more reliably detect each of the phase currents (Iu, Iv, and Iw) using the detection current Idc in each cycle of the carrier signal Cs, the PWM control part 44 adjusts the high level period of each of the PWM pulses (Sx, Sy, and Sz).

More specifically, the PWM control part 44 regards a phase having the largest phase voltage command value, of the U-phase voltage command Vu_ref, the V-phase voltage command Vv_ref, and the W-phase voltage command Vw_ref, as the largest phase and regards a phase having the smallest phase voltage command value as the smallest phase. In addition, the PWM control part 44 regards a phase having a phase voltage command value, of the U-phase voltage command Vu_ref, the V-phase voltage command Vv_ref, and the W-phase voltage command Vw_ref, smaller than that of the largest phase and larger than that of the smallest phase as the intermediate phase.

For example, when the phase voltage command value of the U-phase voltage command Vu_ref, of the U-phase voltage command Vu_ref, the V-phase voltage command Vv_ref, and the W-phase voltage command Vw_ref, is the largest, the PWM control part 44 determines the U-phase as the largest phase. When the phase voltage command value of the W-phase voltage command Vw_ref is the smallest, the PWM control part 44 determines the W-phase as the smallest phase. When the phase voltage command value of the V-phase voltage command Vv_ref is smaller than the phase voltage command value of the U-phase voltage command Vu_ref and larger than the phase voltage command value of the W-phase voltage command Vw_ref, the PWM control part 44 determines the V-phase as the intermediate phase.

The PWM control part 44 generates the PWM pulses (Su and Sx) of the U-phase (largest phase) based on the U-phase voltage command Vu_ref and the carrier signal Cs and particularly generates the PWM pulse Sx as a first PWM pulse. The PWM pulse Sx is an example of "a first PWM pulse" of the disclosure. Here, the U-phase is the largest phase having the largest phase voltage command value of the phase voltage commands (Vu_ref, Vv_ref, and Vw_ref). Moreover, the U-phase voltage command Vu_ref is the largest phase voltage command for the largest phase. In addition, throughout an entire first period (one of the rising period TLup and the falling period TLdown of the carrier signal Cs), the PWM control part 44 causes the PWM pulse Sx (first PWM pulse) to be at a low level. Here, a low level is a level for turning off the lower arm switching element 34*x* for the U-phase (largest phase).

Moreover, the PWM control part 44 generates the PWM pulses (Sw and Sz) of the W-phase (smallest phase) based on the W-phase voltage command Vw_ref and the carrier signal Cs and particularly generates the PWM pulse Sz as a second PWM pulse. The PWM pulse Sz is an example of "a second PWM pulse" of the disclosure. Here, the W-phase is the smallest phase having the smallest phase voltage command value of the phase voltage commands (Vu_ref, Vv_ref, and Vw_ref). Moreover, the W-phase voltage command Vw_ref is the smallest phase voltage command for the smallest phase. In addition, throughout an entire second period (one of the rising period TLup and the falling period TLdown of the carrier signal Cs), the PWM control part 44 causes the PWM pulse Sz (second PWM pulse) to be at a high level. Here, a high level is a level for turning on the lower arm switching element 34*z* for the W-phase (smallest phase).

According to these constitutions, in each cycle of the carrier signal Cs, for example, as illustrated in FIGS. 5A to 10 and 12 (which will be described below), it is possible to reliably ensure a time for the motor drive control device 4 detecting at least the current value (Iu) of the U-phase (largest phase) and a current value (−Iw) of the W-phase (smallest phase) in a three-phase AC voltage. When the current values (Iu and Iw) of the U-phase and the W-phase are detected, the current value (Iv) of the V-phase (remaining intermediate phase) can be calculated using the current values (Iu and Iw) of the two phases described above. Therefore, the current values (Iu, Iv, and Iw) of the respective phases of a three-phase AC voltage can be detected accurately.

In addition, the PWM control part 44 generates the PWM pulses (Sv and Sy) of the V-phase (intermediate phase) based on the V-phase voltage command Vv_ref and the carrier signal Cs. Here, the V-phase is an intermediate phase having a phase voltage command value, of the phase voltage commands (Vu_ref, Vv_ref, and Vw_ref), smaller than that of the U-phase (largest phase) and larger than that of the W-phase (smallest phase). Moreover, the V-phase voltage command Vv_ref is an intermediate phase voltage command for the intermediate phase. At this time, the PWM control part 44 regards a period during which the carrier signal Cs exceeds the phase voltage command Vv_ref of the V-phase (intermediate phase) as the high level period of the PWM pulse Sy of the V-phase (intermediate phase). Accordingly, the PWM control part 44 turns on the lower arm switching element 34y of the V-phase (intermediate phase) during the high level period of the PWM pulse Sy of the V-phase (intermediate phase).

When the PWM pulse Sy of the V-phase (intermediate phase) described above is generated, the PWM control part 44 may start the high level period of the PWM pulse Sy of the V-phase (intermediate phase) at a time after half the rising period TLup of the carrier signal Cs has elapsed. Alternatively, the PWM control part 44 may end the high level period of the PWM pulse Sy of the V-phase (intermediate phase) at a time after half the falling period TLdown of the carrier signal Cs has elapsed.

In addition, when there are two phases having the same phase voltage command value, the PWM control part 44 regards one phase thereof as the intermediate phase. For example, when the phase voltage commands include the V-phase voltage command Vv_ref and the W-phase voltage command Vw_ref as two smallest phase voltage commands, for example, the PWM control part 44 generates the PWM pulses (Sw and Sz) of the W-phase (smallest phase) and particularly generates the PWM pulse Sz as the second PWM pulse based on the W-phase voltage command Vw_ref (one of the two smallest phase voltage commands) and the carrier signal Cs. In addition, the PWM control part 44 generates the PWM pulses (Sv and Sy) of the V-phase (intermediate phase) and particularly generates the PWM pulse Sy as a third PWM pulse based on the V-phase voltage command Vv_ref (the other of the two smallest phase voltage commands) and the carrier signal Cs. That is, the PWM pulse Sy is an example of "a third PWM pulse" of the disclosure.

Figure 5A:
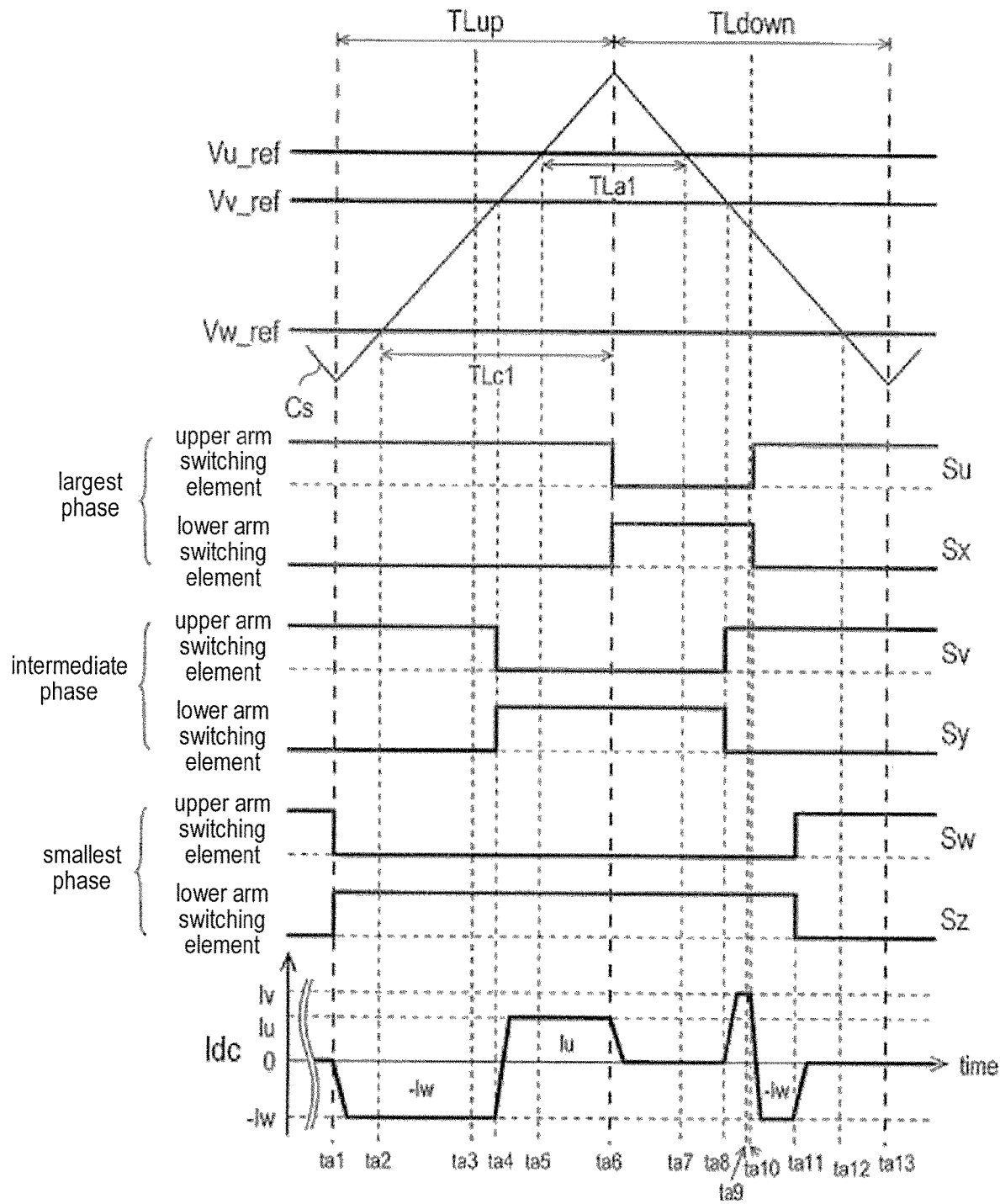
FIG. 5A is a graph showing a detection current with respect to PWM control in a phase θ2 of FIG. 2 in the first constitutive example.
Figure 5B:
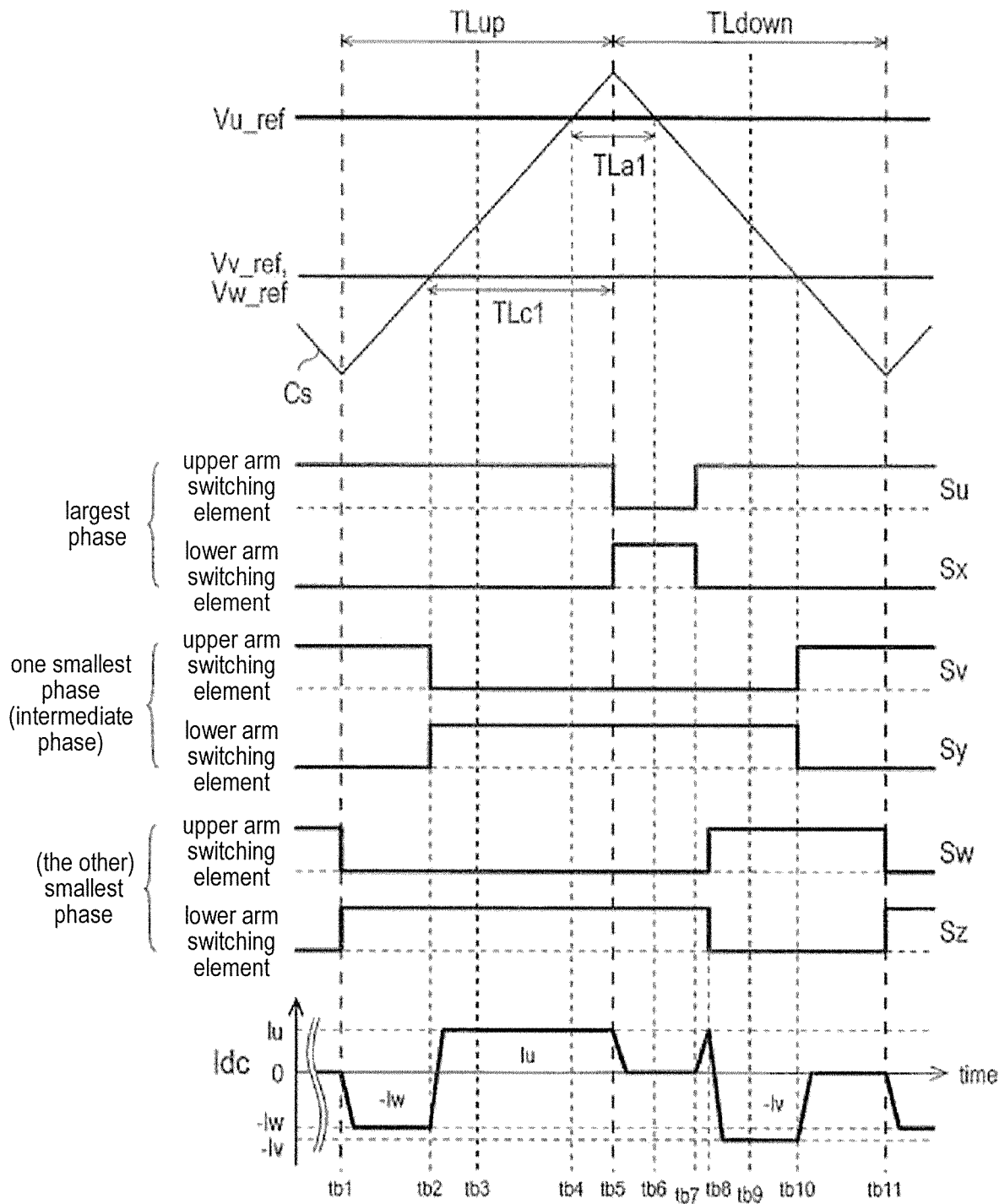
FIG. 5B is a graph showing a detection current with respect to PWM control in a phase θ1 of FIG. 2 in the first constitutive example.

Consequently, for example, when there are two smallest phases such as the V-phase and the W-phase in a three-phase AC voltage, the V-phase (one of the two smallest phases) is regarded as the intermediate phase, so that the lower arm switching element 34y for the V-phase (intermediate phase) can be turned on. Therefore, for example, as illustrated in FIG. 5B (which will be described below), it is possible to prevent changing of a period during which the current value (Iu) of the U-phase (largest phase) can be detected and a period during which the current value (−Iw) of the W-phase (smallest phase) can be detected.

In addition, for example, when the phase voltage commands include the U-phase voltage command Vu_ref and the V-phase voltage command Vv_ref as two largest phase voltage commands, the PWM control part 44 generates the PWM pulses (Su and Sx) of the U-phase (largest phase) and particularly generates the PWM pulse Sx as the first PWM pulse based on the U-phase voltage command Vu_ref (one of the two largest phase voltage commands) and the carrier signal Cs. In addition, the PWM control part 44 generates the PWM pulses (Sv and Sy) of the V-phase (intermediate phase) and particularly generates the PWM pulse Sy as the third PWM pulse based on the V-phase voltage command Vv_ref (the other of the two largest phase voltage commands) and the carrier signal Cs.

Figure 5C:
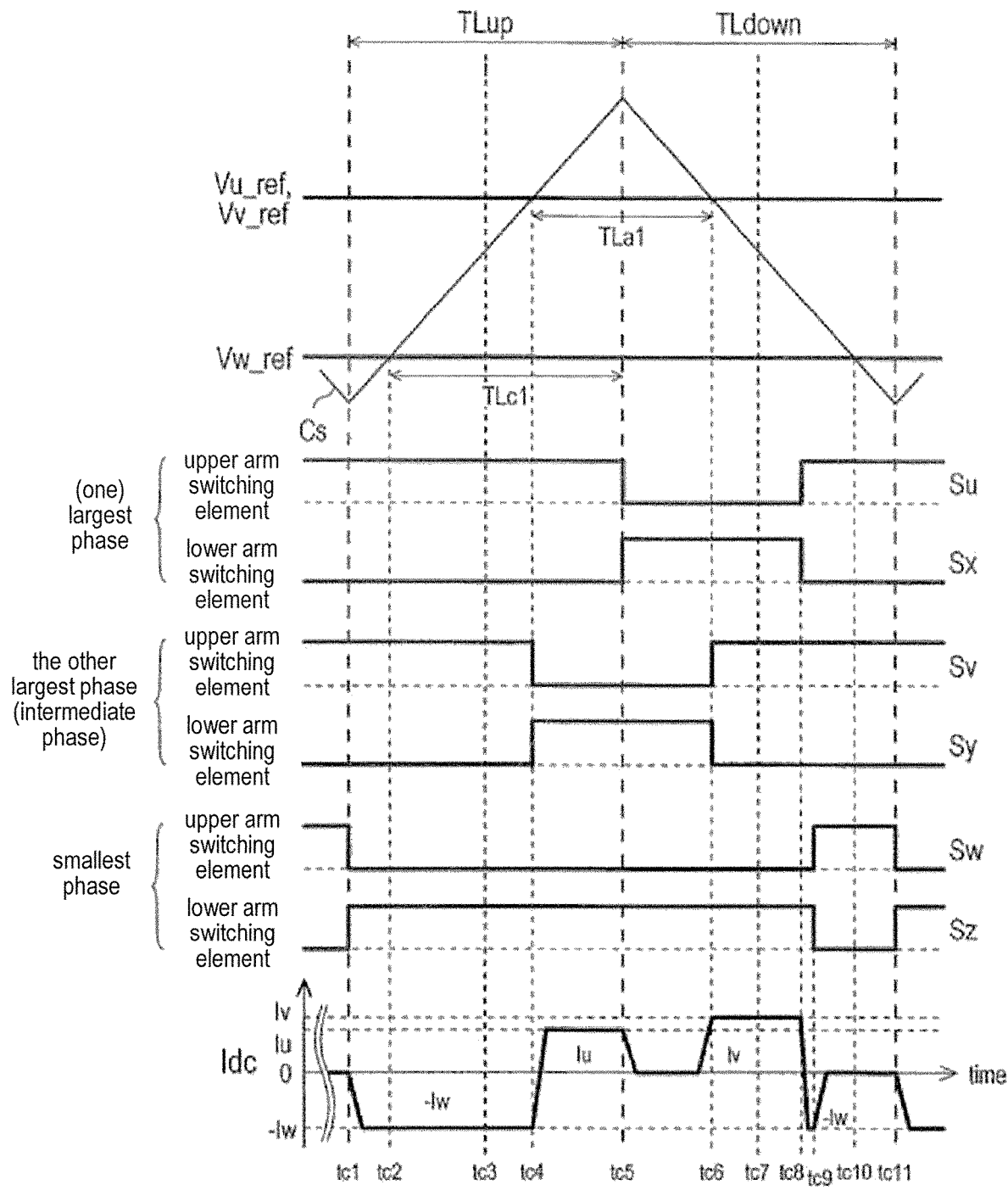
FIG. 5C is a graph showing a detection current with respect to PWM control in a phase θ3 of FIG. 2 in the first constitutive example.

Consequently, for example, when there are two largest phases such as the U-phase and the V-phase in a three-phase AC voltage, the V-phase (one of the two largest phases) is regarded as the intermediate phase, so that the lower arm switching element 34y for the V-phase (intermediate phase) can be turned on. Therefore, for example, as illustrated in FIG. 5C (which will be described below), it is possible to prevent changing of the period during which the current value (Iu) of the U-phase (largest phase) can be detected and the period during which the current value (−Iw) of the W-phase (smallest phase) can be detected.

A more detailed constitution of the PWM control part 44 for performing adjustment thereof will be described below.

The A/D converter 45 performs A/D conversion of the detection current Idc flowing at the low voltage side end of the power part 31 of the PWM inverter 3 and outputs the converted current to the phase voltage command part 41.

<1-4. Relationships Between Respective Arm Switching Element and Phase Currents>

Next, relationships between switching operations of each of the upper arm switching elements (34u, 34v, and 34w) and each of the lower arm switching elements (34x, 34y, and 34z) inside the power part 31 of the PWM inverter 3 and the phase currents of the motor 2 will be described.

Figures 2, 3:
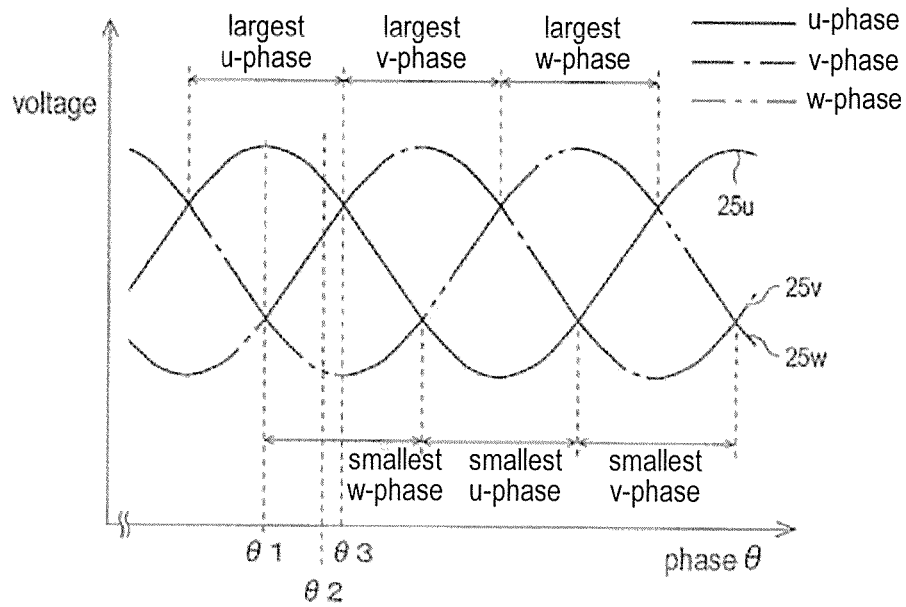
FIG. 2 is an explanatory diagram illustrating an example of a waveform of a three-phase AC voltage output by a PWM inverter.
FIG. 3 is a table showing a detection current output from the PWM inverter with respect to combinations of turning on-off of lower arm switching elements for respective phases.

FIG. 2 is an explanatory diagram illustrating an example of a waveform of a three-phase AC voltage output by the PWM inverter 3. In FIG. 2, a graph 25u of a solid line shows the U-phase voltage Vu. A graph 25v of a one-dot dashed line shows the V-phase voltage Vv. A graph 25w of the two-dot dashed line shows the W-phase voltage Vw. When a sinusoidal current flows in the motor 2, an output voltage of the PWM inverter 3 exhibits a sinusoidal wave shape. As illustrated in FIG. 2, a high-low relationship between the U-phase voltage Vu, the V-phase voltage Vv, and the W-phase voltage Vw regarding a voltage level changes with the lapse of time.

In the PWM inverter 3, a DC voltage from the DC power source 5 is converted into a three-phase AC voltage due to a switching operation of each of the upper arm switching elements (34u, 34v, and 34w) corresponding to the PWM pulses (Su, Sv, and Sw) and a switching operation of each of the lower arm switching elements (34x, 34y, and 34z) corresponding to the PWM pulses (Sx, Sy, and Sz). Further, when each of the phase voltages (Vu, Vv, and Vw) of a three-phase AC voltage is applied to the motor 2, the currents (Iu, Iv, and Iw) corresponding to the respective phase voltages (Vu, Vv, and Vw) flow to the respective armature windings (22u, 22v, and 22w) of the motor 2, and thus the motor 2 is driven.

Here, there are eight patterns of the switching operations of the upper arm switching elements (34u, 34v, and 34w) and the lower arm switching elements (34x, 34y, and 34z), as follows. In the first pattern, all the upper arm switching elements (34u, 34v, and 34w) of the U-phase, the V-phase, and the W-phase are turned on. In the second pattern, the upper arm switching element 34u of the U-phase is turned on, and the lower arm switching elements (34y and 34z) of the V-phase and the W-phase are turned on. In the third pattern, the upper arm switching elements (34u and 34v) of the U-phase and the V-phase are turned on, and the lower arm switching element 34z of the W-phase is turned on. In the fourth pattern, the upper arm switching element 34v of the V-phase is turned on, and the lower arm switching elements (34z and 34x) of the W-phase and the U-phase are turned on. In the fifth pattern, the upper arm switching elements (34v and 34w) of the V-phase and the W-phase are turned on, and the lower arm switching element 34x of the U-phase is turned on. In the sixth pattern, the upper arm switching element 34w of the W-phase is turned on, and the lower arm switching elements (34x and 34y) of the U-phase and the V-phase are turned on. In the seventh pattern, the upper arm switching elements (34w and 34u) of the W-phase and the U-phase are turned on, and the lower arm switching element 34y of the V-phase is turned on. In the eighth pattern, all the lower arm switching elements (34x, 34y, and 34z) of the U-phase, the V-phase, and the W-phase on the low voltage side are turned on.

Actually, when turning on-off of the upper arm switching elements (34u, 34v, and 34w) and the lower arm switching elements (34x, 34y, and 34z) is switched, a dead time is provided. During a period of the dead time, the upper arm switching elements (34u, 34v, and 34w) and the lower arm switching elements (34x, 34y, and 34z) are turned off simultaneously in the same legs (32u, 32v, and 32w). However, in this specification, for easier understanding, description will be given in disregard of the dead time for avoiding short circuits caused when the upper arm switching elements (34u, 34v, and 34w) and the lower arm switching elements (34x, 34y, and 34z) are simultaneously turned on in the respective legs (32u, 32v, and 32w). In this case, the lower arm switching elements (34x, 34y, and 34z) on the low voltage side are turned off during a period during which the upper arm switching elements (34u, 34v, and 34w) are turned on. In addition, the lower arm switching elements (34x, 34y, and 34z) on the low voltage side are turned on during a period during which the upper arm switching elements (34u, 34v, and 34w) are turned off.

In addition, the phase currents detected using the detection current Idc vary depending on the patterns of the switching operations of the upper arm switching elements (34u, 34v, and 34w) and the lower arm switching elements (34x, 34y, and 34z). FIG. 3 is a table showing the detection current Idc output from the PWM inverter 3 with respect to combinations of turning on-off of the lower arm switching elements (34x, 34y, and 34z) for the respective phases.

In the first pattern described above, all the PWM pulses (Sx, Sy, and Sz) are at a low level. Therefore, all the lower arm switching elements (34x, 34y, and 34z) are turned off. In this case, since the detection current Idc becomes zero, no phase current is detected.

In the second pattern described above, the PWM pulse Sx is at a low level, and the PWM pulses (Sy and Sz) are at a high level. Therefore, the lower arm switching element 34x of the U-phase is turned off, and the lower arm switching elements (34y and 34z) of the V-phase and the W-phase are turned on. In this case, the detection current Idc becomes the same current value as the U-phase current Iu.

In the third pattern described above, the PWM pulses (Sx and Sy) are at a low level, and the PWM pulse Sz is at a high level. Therefore, the lower arm switching elements (34x and 34y) of the U-phase and the V-phase are turned off, and the lower arm switching element 34z of the W-phase is turned on. In this case, the detection current Idc has the same current value as the W-phase current (−Iw).

In the fourth pattern described above, the PWM pulse Sy is at a low level, and the PWM pulses (Sx and Sz) are at a high level. Therefore, the lower arm switching element 34y of the V-phase is turned off, and the lower arm switching elements (34x and 34z) of the U-phase and the W-phase are turned on. In this case, the detection current Idc has the same current value as the V-phase current Iv.

In the fifth pattern described above, the PWM pulses (Sy and Sz) are at a low level, and the PWM pulse Sx is at a high level. Therefore, the lower arm switching elements (34y and 34z) of the V-phase and the W-phase are turned off, and the lower arm switching element 34x of the U-phase is turned on. In this case, the detection current Idc has the same current value as a U-phase current (−Iu).

In the sixth pattern described above, the PWM pulse Sz is at a low level, and the PWM pulses (Sx and Sy) are at a high level. Therefore, the lower arm switching element 34z of the W-phase is turned off, and the lower arm switching elements (34x and 34y) of the U-phase and the V-phase are turned on. In this case, the detection current Idc has the same current value as the W-phase current Iw.

In the seventh pattern described above, the PWM pulses (Sx and Sz) are at a low level, and the PWM pulse Sy is at a high level. Therefore, the lower arm switching elements (34x and 34z) of the U-phase and the W-phase are turned off, and the lower arm switching element 34y of the V-phase is turned on. In this case, the detection current Idc has the same current value as a V-phase current (−Iv).

In the eighth pattern described above, all the PWM pulses (Sx, Sy, and Sz) are at a high level. Therefore, all the lower arm switching elements (34x, 34y, and 34z) are turned on. In this case, since the detection current Idc becomes zero, no phase current is detected.

2. Constitution of PWM Control Part

Next, a specific constitution of the PWM control part 44 will be described.

<2-1. First Constitutive Example of PWM Control Part>

Figure 4:
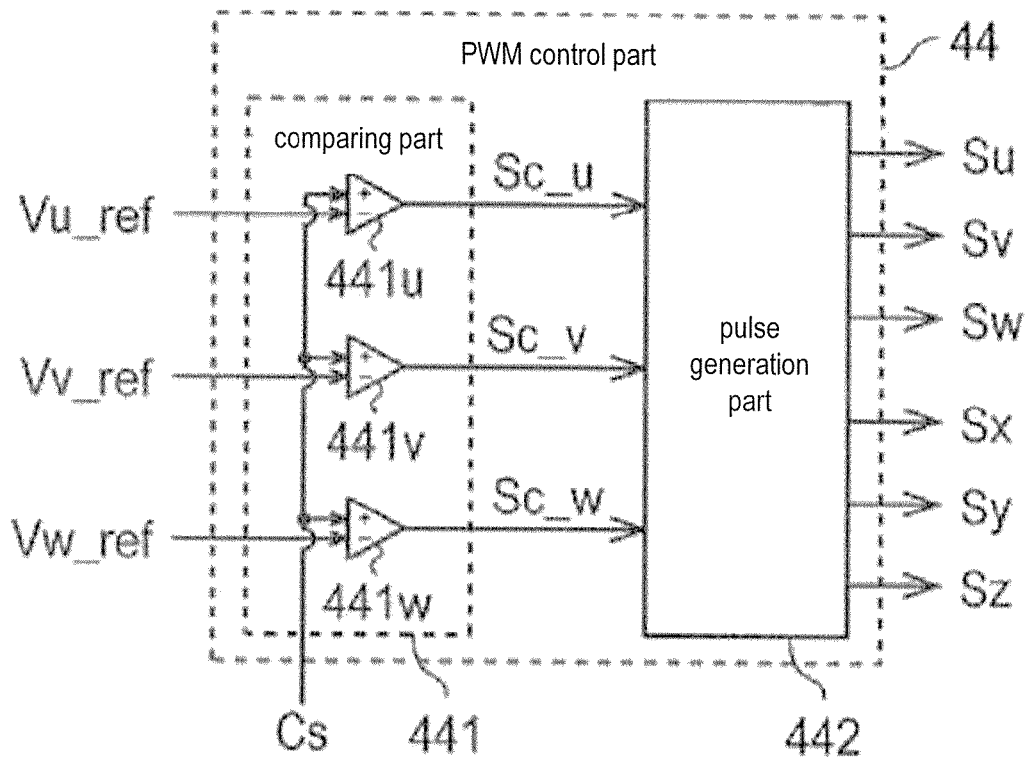
FIG. 4 is a block diagram illustrating a first constitutive example of a PWM control part.

FIG. 4 is a block diagram illustrating a first constitutive example of the PWM control part 44. FIG. 5A is a graph showing a detection current with respect to PWM control in a phase θ2 of FIG. 2 in the first constitutive example. Hereinafter, in order to facilitate understanding, the dead times between the PWM pulses (Su, Sv, and Sw) of the upper arm switching elements (34u, 34v, and 34w) and the PWM pulses (Sx, Sy, and Sz) of the lower arm switching elements (34x, 34y, and 34z) will be omitted. In this case, the waveforms of the PWM pulses (Su, Sv, and Sw) become waveforms in which the positive poles and the negative poles of the respective PWM pulses (Sx, Sy, and Sz) are inverted. Therefore, the high level period of the PWM pulses (Su, Sv, and Sw) becomes a low level period of the PWM pulses (Sx, Sy, and Sz), and the low level period of the PWM pulses (Su, Sv, and Sw) becomes the high level period of the PWM pulses (Sx, Sy, and Sz). Thus, hereinafter, description of the PWM pulses (Su, Sv, and Sw) may be omitted.

As illustrated in FIG. 4, the PWM control part 44 has a comparing part 441 and a pulse generation part 442.

The comparing part 441 compares the carrier signal Cs to the phase voltage commands (Vu_ref, Vv_ref, and Vw_ref) and outputs comparison results to the pulse generation part 442. More specifically, the comparing part 441 has a comparator 441u, a comparator 441v, and a comparator 441w.

The comparator 441u compares the carrier signal Cs to the U-phase voltage command Vu_ref and outputs a signal Sc_u as a comparison result thereof to the pulse generation part 442. For example, in FIG. 5A, during a period from a time ta1 to a time ta13 (one cycle of the carrier signal Cs), the signal Sc_u is at a high level during a period from a time ta5 to a time ta7 (period during which the carrier signal Cs exceeds the U-phase voltage command Vu_ref) and is at a low level during periods from the time ta1 to the time ta5 and from the time ta7 to the time ta13 (periods during which the carrier signal Cs does not exceed the U-phase voltage command Vu_ref).

The comparator 441v compares the carrier signal Cs to the V-phase voltage command Vv_ref and outputs a signal Sc_v as a comparison result thereof to the pulse generation part 442. For example, in FIG. 5A, for example, during the period from the time ta1 to the time ta13 (one cycle of the carrier signal Cs), the signal Sc_v is at a high level during a period from a time ta4 to a time ta8 (period during which the carrier signal Cs exceeds the V-phase voltage command Vv_ref) and is at a low level during periods from the time ta1 to the time ta4 and from the time ta8 to the time ta13 (periods during which the carrier signal Cs does not exceed the V-phase voltage command Vv_ref).

The comparator 441w compares the carrier signal Cs to the W-phase voltage command Vw_ref and outputs a signal Sc_w as a comparison result thereof to the pulse generation part 442. For example, in FIG. 5A, for example, during the period from the time ta1 to the time ta13 (one cycle of the carrier signal Cs), the signal Sc_w is at a high level during a period from a time ta2 to a time ta12 (period during which the carrier signal Cs exceeds the W-phase voltage command Vw_ref) and is at a low level during periods from the time ta1 to the time ta2 and from the time ta12 to the time ta13 (periods during which the carrier signal Cs does not exceed the W-phase voltage command Vw_ref).

The pulse generation part 442 generates the PWM pulses (Su, Sv, Sw, Sx, Sy, and Sz) based on the comparison results of the comparing part 441.

Next, with reference to FIG. 5A, PWM control in the first constitutive example and phase currents detected by the motor drive control device 4 using the detection current Idc with respect to PWM control will be described.

First, in FIG. 5A, the phase voltage command value of the U-phase voltage command Vu_ref is the largest, and the phase voltage command value of the W-phase voltage command Vw_ref is the smallest. In addition, the phase voltage command value of the V-phase voltage command Vv_ref is smaller than the phase voltage command value of the U-phase voltage command Vu_ref and larger than the phase voltage command value of the W-phase voltage command Vw_ref. In this case, the pulse generation part 442 regards the U-phase having the largest phase voltage command value, of the U-phase voltage command Vu_ref, the V-phase voltage command Vv_ref, and the W-phase voltage command Vw_ref, as the largest phase and regards the W-phase having the smallest phase voltage command value as the smallest phase. In addition, the pulse generation part 442 regards the V-phase having a phase voltage command value, of the U-phase voltage command Vu_ref, the V-phase voltage command Vv_ref, and the W-phase voltage command Vw_ref, smaller than that of the U-phase (largest phase) and larger than that of the W-phase (smallest phase) as the intermediate phase.

Next, regarding the PWM pulse Sx of the U-phase (largest phase), based on a result in which the U-phase voltage command Vu_ref (largest phase voltage command) is compared to the carrier signal Cs by the comparing part 441, the pulse generation part 442 generates the PWM pulses (Su and Sx) of the U-phase (largest phase) and particularly generates the PWM pulse Sx as the first PWM pulse. At this time, in each cycle of the carrier signal Cs, the pulse generation part 442 causes a duration of a first level period to become the same as a duration TLa1 (first duration). That is, the duration TLa1 is an example of "the first duration" of the disclosure. Here, the first level period is a period during which the PWM pulse Sx (first PWM pulse) is at a high level (level for turning on the lower arm switching element 34x for the U-phase (largest phase)). In addition, the duration TLa1 (first duration) is a duration of a period during which the carrier signal Cs exceeds the U-phase voltage command Vu_ref (largest phase voltage command).

For example, in each cycle of the carrier signal Cs, the pulse generation part 442 regards a time of starting the high level period of the PWM pulse Sx as a time ta6 of ending the rising period TLup of the carrier signal Cs. Moreover, the pulse generation part 442 causes a duration of the high level period of the PWM pulse Sx to become the same as the duration TLa1 of the period during which the carrier signal Cs exceeds the U-phase voltage command Vu_ref (largest phase voltage command). Accordingly, in one cycle of the carrier signal Cs, the pulse generation part 442 turns on the lower arm switching element 34x for the U-phase (largest phase) during a period from the time ta6 to a time ta10 (high level period of the PWM pulse Sx).

Consequently, the high level period of the PWM pulse Sx can be adjusted without changing a duty ratio of the PWM pulse Sx from the duty ratio necessary to realize the phase voltage Vu of the U-phase (largest phase in the phase θ2 of FIG. 2). Moreover, during at least the rising period TLup of the carrier signal Cs, the pulse generation part 442 causes the PWM pulse Sx to be at a low level, such that the lower arm switching element 34x can be turned off.

In addition, regarding the PWM pulse Sz of the W-phase (smallest phase), based on a result in which the W-phase voltage command Vw_ref (smallest phase voltage command) is compared to the carrier signal Cs by the comparing part 441, the pulse generation part 442 generates the PWM pulses (Sw and Sz) of the W-phase (smallest phase) and particularly generates the PWM pulse Sz as the second PWM pulse. At this time, in each cycle of the carrier signal Cs, the pulse generation part 442 causes a duration of a second level period to become the same as twice a duration TLc1 (second duration). That is, the duration TLc1 is an example of "the second duration" of the disclosure. The second level period is a period during which the PWM pulse Sz (second PWM pulse) is at a high level (level for turning on the lower arm switching element 34z for the W-phase (smallest phase)). In addition, the duration TLc1 (second duration) is a duration of a period during which the carrier signal exceeds the W-phase voltage command Vw_ref (smallest phase voltage command) during the rising period TLup described above.

For example, in each cycle of the carrier signal Cs, the pulse generation part 442 regards a time of starting the high level period of the PWM pulse Sz as the time ta1 of starting the rising period TLup of the carrier signal Cs. Moreover, the pulse generation part 442 causes a duration of the high level period of the PWM pulse Sz to become the same as a duration of the period during which the carrier signal Cs exceeds the W-phase voltage command Vw_ref. Regarding the duration of the high level period of the PWM pulse Sz, for example, twice the duration TLc1 from the time ta2 to the time ta6 (period during which the carrier signal Cs exceeds the W-phase voltage command Vw_ref during the rising period TLup) can be employed. The time ta2 is a time of starting the foregoing period, and the time ta6 is a time of ending the rising period TLup. Accordingly, the pulse generation part 442 turns on the lower arm switching element 34z for the W-phase (smallest phase) during a period from the time ta1 to a time ta11 (high level period of the PWM pulse Sz).

Consequently, the high level period of the PWM pulse Sz can be adjusted without changing a duty ratio of the PWM pulse Sz from the duty ratio necessary to realize the phase voltage Vw of the W-phase (smallest phase in the phase θ2 of FIG. 2). Moreover, throughout at least the entire rising period TLup of the carrier signal Cs, the pulse generation part 442 can turn on the lower arm switching element 34z of the W-phase (smallest phase).

In addition, regarding the PWM pulse Sy of the V-phase (intermediate phase), based on a result in which the V-phase voltage command Vv_ref (intermediate phase voltage command) is compared to the carrier signal Cs by the comparing part 441, the pulse generation part 442 generates the PWM pulses (Sv and Sy) of the V-phase (intermediate phase). At this time, for example, in each cycle of the carrier signal Cs, the pulse generation part 442 regards a period from the time ta4 of starting the period during which the carrier signal Cs exceeds the V-phase voltage command Vv_ref to the time tab of ending the foregoing period as the high level period of the PWM pulse Sy.

In one cycle of the carrier signal Cs, the motor drive control device 4 can detect the current value (Iu) of the U-phase (largest phase) between the time ta4 and the time ta6 using the detection current Idc by generating the PWM pulses (Sx, Sy, and Sz) as described above. Moreover, the motor drive control device 4 can detect the current value (−Iw) of the W-phase (smallest phase) between the time ta1 and the time ta4 and between the time ta10 and the time ta11 using the detection current Idc. The current value (Iv) of the V-phase (intermediate phase) can be calculated using the current values (Iu and −Iw) of the two phases described above. Therefore, the current values (Iu, Iv, and Iw) of the respective phases of a three-phase AC voltage can be detected accurately.

In FIG. 5A described above, a case where the largest phase, the smallest phase, and the intermediate phase can be clearly distinguished from each other has been described. That is, a case where the phase voltages (Vu, Vv, and Vw) are different from each other has been described. However, for example, when there are two smallest phases as in a phase θ1 of FIG. 2, the pulse generation part 442 regards one of the two smallest phases as the intermediate phase and regards the other as the smallest phase, thereby generating the PWM pulses (Sx, Sy, and Sz). In addition, for example, when there are two largest phases as in a phase θ3 of FIG. 2, the pulse generation part 442 regards one of the two largest phases as the intermediate phase and regards the other as the largest phase, thereby generating the PWM pulses (Sx, Sy, and Sz).

First, a case where there are two smallest phases will be described. FIG. 5B is a graph showing a detection current with respect to PWM control in the phase θ1 of FIG. 2 in the first constitutive example.

In FIG. 5B, there are two smallest phases such as the V-phase and the W-phase having the smallest phase voltage command value. In this case, the pulse generation part 442 regards one of the two phases as the intermediate phase. In the present embodiment, the W-phase is regarded as the smallest phase and the V-phase is regarded as the intermediate phase, but the embodiment is not limited to this example. Alternatively, the V-phase may be regarded as the smallest phase and the W-phase may be regarded as the intermediate phase.

When the PWM pulse Sx of the U-phase (largest phase) is generated, the pulse generation part 442 causes the time of starting the high level period of the PWM pulse Sx to become a time tb5 of ending the rising period TLup of the carrier signal Cs, in each cycle of the carrier signal Cs. Moreover, the pulse generation part 442 causes the duration of the high level period of the PWM pulse Sx to become the same as the duration TLa1 from a starting time tb4 to an ending time tb6 of the period during which the carrier signal Cs exceeds the U-phase voltage command Vu_ref.

In addition, when the PWM pulse Sz of the W-phase (smallest phase) is generated, the pulse generation part 442 causes the time of starting the high level period of the PWM pulse Sz to become a time tb1 of starting the rising period TLup of the carrier signal Cs, in each cycle of the carrier signal Cs. Moreover, the pulse generation part 442 causes the duration of the high level period of the PWM pulse Sz to become the same as the duration of the period during which the carrier signal Cs exceeds the W-phase voltage command Vw_ref. For example, twice the duration TLc1 from a time tb2 to the time tb5 (period during which the carrier signal Cs exceeds the W-phase voltage command Vw_ref during the rising period TLup) is regarded as the duration of the high level period of the PWM pulse Sz.

Next, regarding the PWM pulse Sy of the V-phase (intermediate phase), based on a result in which the V-phase voltage command Vv_ref (intermediate phase voltage command) is compared to the carrier signal Cs by the comparing part 441, the pulse generation part 442 generates the PWM pulses (Sv and Sy) for the V-phase (intermediate phase). At this time, for example, in each cycle of the carrier signal Cs, the pulse generation part 442 regards a period from the time tb2 of starting the period during which the carrier signal Cs exceeds the V-phase voltage command Vv_ref to a time tb10 of ending the foregoing period as the high level period of the PWM pulse Sy.

In one cycle of the carrier signal Cs, the motor drive control device 4 can detect the current value (−Iw) of the W-phase (smallest phase) between the time tb1 and the time tb2 using the detection current Idc by generating the PWM pulses Sx, Sy, and Sz as described above. Moreover, the motor drive control device 4 can detect the current value (Iu) of the U-phase (largest phase) between the time tb2 and the time tb5 and can detect a current value (−Iv) of the V-phase (intermediate phase) between a time tb8 and the time tb10 using the detection current Idc.

According to this constitution, when there are two smallest phases in a three-phase AC voltage, one smallest phase is regarded as the intermediate phase, so that the lower arm switching element for the intermediate phase can be turned on. The motor drive control device 4 can detect the current values (Iu, Iv, and Iw) of the respective phases using the detection current Idc.

Next, a case where there are two largest phases will be described. FIG. 5C is a graph showing the detection current Idc with respect to PWM control in the phase θ3 of FIG. 2 in the first constitutive example.

In FIG. 5C, there are two largest phases such as the U-phase and the V-phase having the largest phase voltage command value. In this case, the pulse generation part 442 regards one of the two phases as the intermediate phase. In the present embodiment, the U-phase is regarded as the largest phase and the V-phase is regarded as the intermediate phase, but the embodiment is not limited to this example. Alternatively, the V-phase may be regarded as the largest phase and the U-phase may be regarded as the intermediate phase.

Next, when the PWM pulse Sx of the U-phase (largest phase) is generated, the pulse generation part 442 causes the time of starting the high level period of the PWM pulse Sx to become a time tc5 of ending the rising period TLup of the carrier signal Cs, in each cycle of the carrier signal Cs. Moreover, the pulse generation part 442 causes the duration of the high level period of the PWM pulse Sx to become the same as the duration TLa1 from a starting time tc4 to an ending time tc6 of the period during which the carrier signal Cs exceeds the U-phase voltage command Vu_ref.

In addition, when the PWM pulse Sz of the W-phase (smallest phase) is generated, the pulse generation part 442 causes the time of starting the high level period of the PWM pulse Sz to become a time tc1 of starting the rising period TLup of the carrier signal Cs, in each cycle of the carrier signal Cs. Moreover, the pulse generation part 442 causes the duration of the high level period of the PWM pulse Sz to become the same as the duration of the period during which the carrier signal Cs exceeds the W-phase voltage command Vw_ref. For example, twice the duration TLc1 from a time tc2 to the time tc5 (period during which the carrier signal Cs exceeds the W-phase voltage command Vw_ref during the rising period TLup) is regarded as the duration of the high level period of the PWM pulse Sz. The time tc2 is a time of starting the foregoing period, and the time tc5 is a time of ending the rising period TLup.

Next, regarding the PWM pulse Sy of the V-phase (intermediate phase), based on a result in which the V-phase voltage command Vv_ref (intermediate phase voltage command) is compared to the carrier signal Cs by the comparing part 441, the pulse generation part 442 generates the PWM pulses (Sv and Sy) of the V-phase (intermediate phase). At this time, for example, in each cycle of the carrier signal Cs, the pulse generation part 442 regards a period from the starting time tc4 to the ending time tc6 of the period during which the carrier signal Cs exceeds the V-phase voltage command Vv_ref as the high level period of the PWM pulse Sy.

In one cycle of the carrier signal Cs, the motor drive control device 4 can detect the current value (−Iw) of the W-phase (smallest phase) between the time tc1 and the time tc4 using the detection current Idc by generating the PWM pulses (Sx, Sy, and Sz) as described above. Moreover, the motor drive control device 4 can detect the current value (Iu) of the U-phase (largest phase) between the time tc4 and the time tc5 and can detect the current value (Iv) of the V-phase (intermediate phase) between the time tc6 and a time tc8 using the detection current Idc.

According to this constitution, when there are two largest phases in a three-phase AC voltage, one largest phase is regarded as the intermediate phase, so that the lower arm switching element for the intermediate phase can be turned on. The motor drive control device 4 can detect the current values (Iu, Iv, and Iw) of the respective phases using the detection current Idc.

<2-1-1. First Modification Example of PWM Control in First Constitutive Example>

In the example of PWM control described above, the high level period of PWM pulses having the largest phase and the smallest phase is adjusted, but the high level period of PWM pulses having the intermediate phase may further be adjusted.

Figure 6:
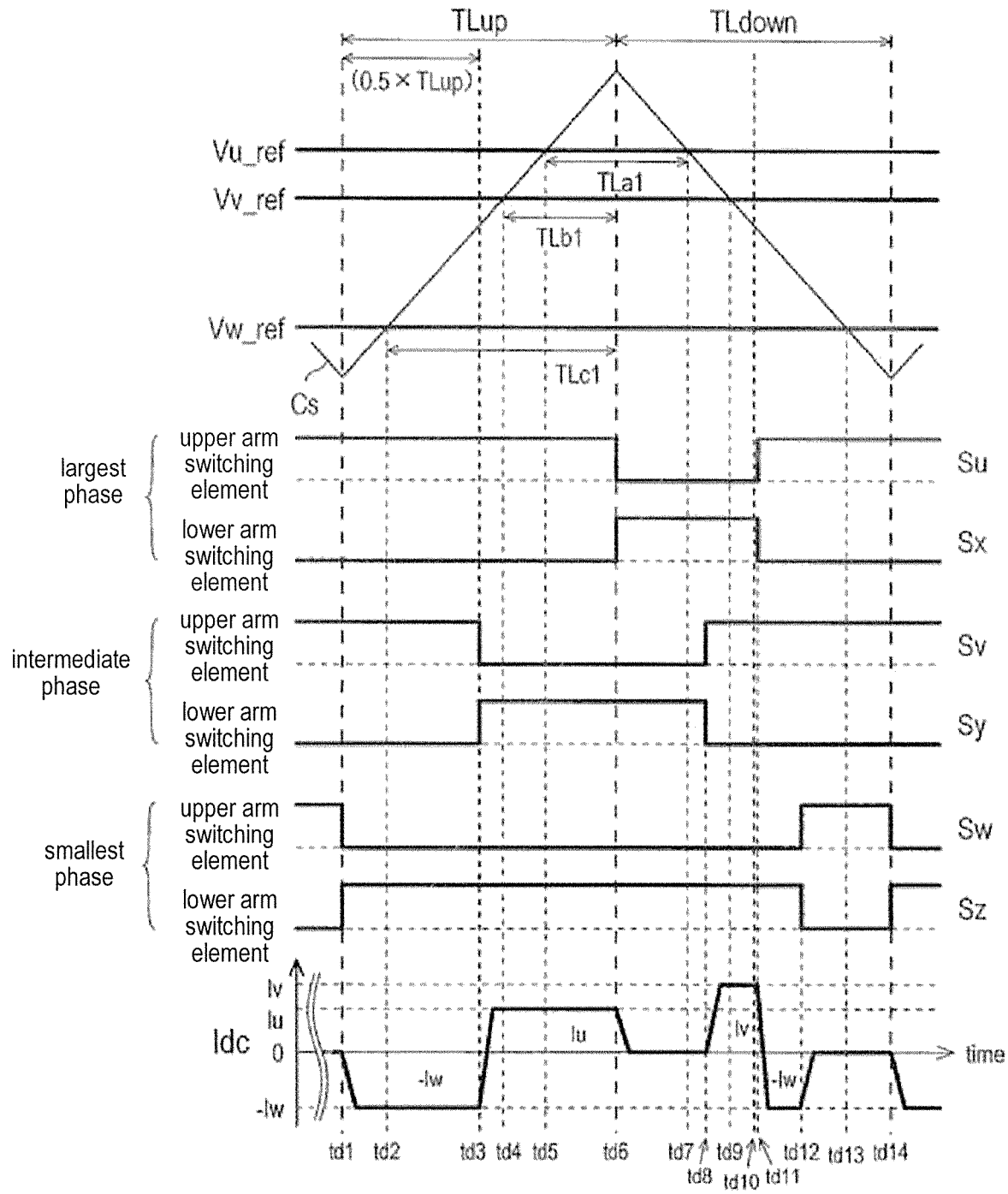
FIG. 6 is a graph showing a detection current with respect to PWM control in a first modification example.

FIG. 6 is a graph showing a detection current with respect to PWM control in a first modification example. FIG. 6 corresponds to the phase θ2 of FIG. 2.

In FIG. 6, the pulse generation part 442 regards the U-phase as the largest phase, regards the W-phase as the smallest phase, and regards the V-phase as the intermediate phase. When there are two smallest phases in the first modification example, similar to the first constitutive example, the pulse generation part 442 regards one of the two smallest phases as the intermediate phase and regards the other as the smallest phase, thereby generating the PWM pulses (Sx, Sy, and Sz). In addition, when there are two largest phases in the first modification example, similar to the first constitutive example, the pulse generation part 442 regards one of the two largest phases as the intermediate phase and regards the other as the largest phase, thereby generating the PWM pulses (Sx, Sy, and Sz).

When the PWM pulse Sx of the U-phase (largest phase) is generated, the pulse generation part 442 causes the time of starting the high level period of the PWM pulse Sx to become a time td6 of ending the rising period TLup of the carrier signal Cs, in each cycle of the carrier signal Cs. Moreover, the pulse generation part 442 causes the duration of the high level period of the PWM pulse Sx to become the same as the duration TLa1 from a starting time td5 to an ending time td7 of the period during which the carrier signal Cs exceeds the U-phase voltage command Vu_ref.

In addition, when the PWM pulse Sz of the W-phase (smallest phase) is generated, the pulse generation part 442 causes the time of starting the high level period of the PWM pulse Sz to become a time td1 of starting the rising period TLup of the carrier signal Cs, in each cycle of the carrier signal Cs. Moreover, the pulse generation part 442 causes the duration of the high level period of the PWM pulse Sz to become the same as the duration of the period during which the carrier signal Cs exceeds the W-phase voltage command Vw_ref. For example, twice the duration TLc1 from a time td2 to the time td6 (period during which the carrier signal Cs exceeds the W-phase voltage command Vw_ref during the rising period TLup) is regarded as the duration of the high level period of the PWM pulse Sz.

Next, regarding the PWM pulse Sy of the V-phase (intermediate phase), based on a result in which the V-phase voltage command Vv_ref is compared to the carrier signal Cs by the comparing part 441, the pulse generation part 442 generates the PWM pulses (Sv and Sy) of the V-phase (intermediate phase) and particularly generates the PWM pulse Sy as the third PWM pulse. Here, the V-phase is an intermediate phase having a phase voltage command value, of the phase voltage commands Vu_ref, Vv_ref, and Vw_ref, smaller than that of the U-phase voltage command Vu_ref (largest phase voltage command) and larger than that of the W-phase voltage command Vw_ref (smallest phase voltage command). Moreover, the V-phase voltage command Vv_ref is an intermediate phase voltage command for the intermediate phase. At this time, in each cycle of the carrier signal Cs, the pulse generation part 442 regards a time of starting a third level period during which the PWM pulse Sy (third PWM pulse) is at a high level (level for turning on the lower arm switching element 34y for the V-phase (intermediate phase)) as a time td3. Here, the time td3 is a time after a duration (0.5×TLup) (fifth duration that is half a duration of the rising period TLup) has elapsed from the time td1 of starting the rising period TLup of the carrier signal Cs. That is, the duration (0.5×TLup) is an example of "a fifth duration" of the disclosure. Moreover, in each cycle of the carrier signal Cs, the pulse generation part 442 causes a duration of the third level period described above to become the same as twice a duration TLb1 (sixth duration). That is, the duration TLb1 is an example of "a sixth duration" of the disclosure. Here, the duration TLb1 (sixth duration) is a duration of the period during which the carrier signal Cs exceeds the W-phase voltage command Vw_ref (intermediate phase voltage command) during the rising period TLup.

For example, in each cycle of the carrier signal Cs, the pulse generation part 442 regards a time of starting the high level period of the PWM pulse Sy as the time td3 that is a time after the duration (0.5×TLup) (half the rising period TLup) has elapsed from the time td1 of starting the rising period TLup of the carrier signal Cs. Moreover, the pulse generation part 442 causes a duration of the high level period of the PWM pulse Sy (third PWM pulse) to become approximately the same as a duration of the period during which the carrier signal Cs exceeds the V-phase voltage command Vv_ref. Regarding the duration of the high level period of the PWM pulse Sy, for example, twice the duration TLb1 from a time td4 to the time td6 (period during which the carrier signal Cs exceeds the V-phase voltage command Vv_ref (intermediate phase voltage command) during the rising period TLup) can be employed. Accordingly, the pulse generation part 442 turns on the lower arm switching element 34y for the W-phase (smallest phase) during a period from the time td3 to a time td8 (high level period of the PWM pulse Sy (third PWM pulse)).

Consequently, the high level period of the PWM pulse Sy can be adjusted without changing a duty ratio of the PWM pulse Sy from the duty ratio necessary to realize the phase voltage Vv of the V-phase (intermediate phase in the phase θ2 of FIG. 2). In addition, the time of starting the high level period of the PWM pulse Sy during which the lower arm switching element 34y of the V-phase (intermediate phase) is turned on can be fixed to the time td3 in the middle of the rising period TLup in each cycle of the carrier signal Cs.

According to the constitution described above, the time of starting the high level period of the PWM pulse Sy during which the lower arm switching element 34y of the V-phase (intermediate phase) is turned on is fixed to the time td3 in the middle of the rising period TLup in each cycle of the carrier signal Cs. Therefore, as in FIG. 6, when the PWM pulse Sx of the U-phase (largest phase) is at a low level and the PWM pulse Sz of the W-phase (smallest phase) is at a high level throughout the entire rising period TLup, the current value (−Iw) of the W-phase (smallest phase) during the first half of the rising period TLup can be detect, and the current value (Iu) of the U-phase (largest phase) during the latter half of the rising period TLup can be detected. That is, it is possible to fix the period during which the current value (Iu) of the U-phase (largest phase) can be detected and the period during which the current value (−Iw) of the W-phase (smallest phase) can be detected. Therefore, accurate current values of the respective phases of a three-phase AC voltage can be detected more quickly and more easily.

<2-1-2. Second Modification Example of PWM Control in First Constitutive Example>

Figure 7:
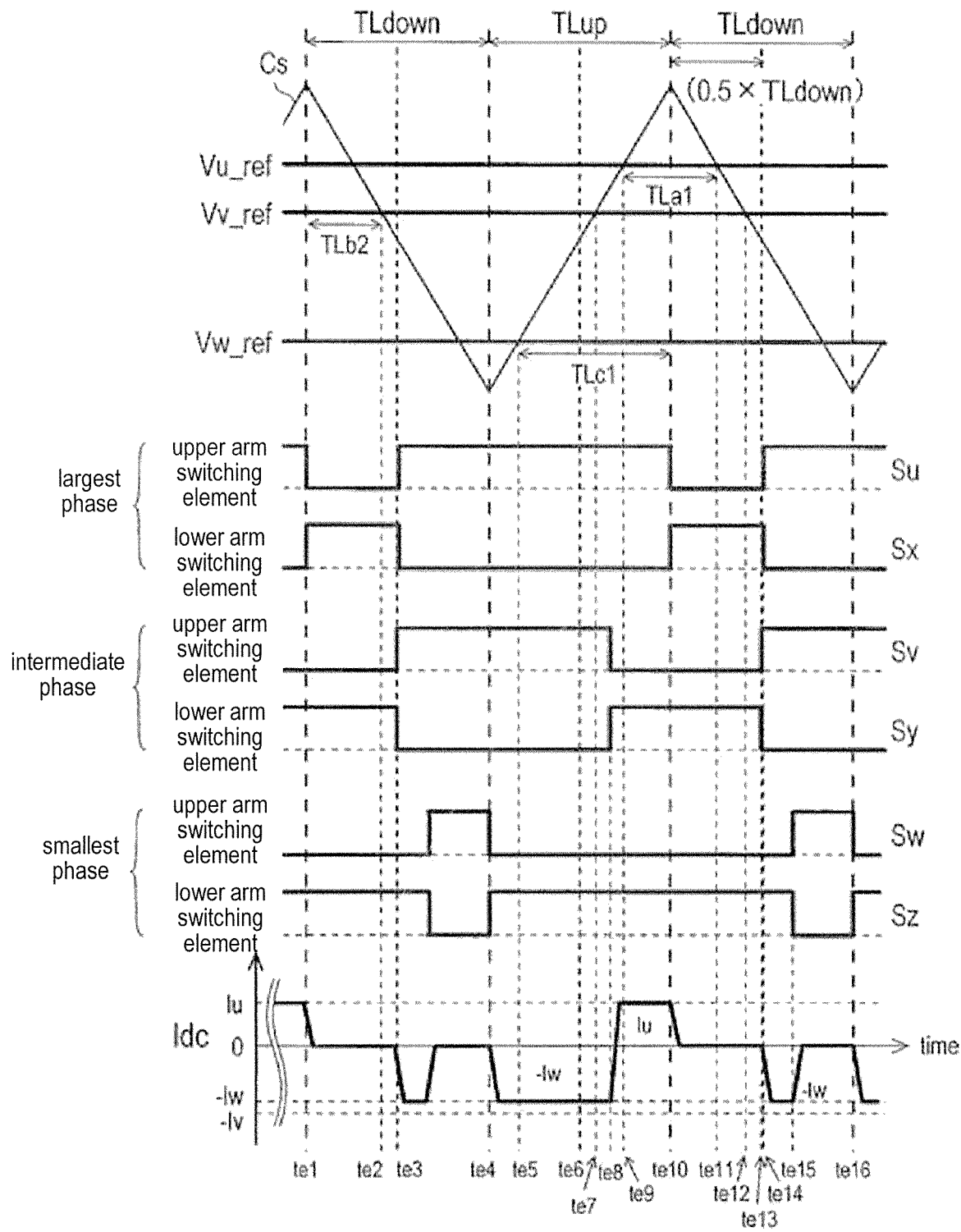
FIG. 7 is a graph showing a detection current with respect to PWM control in a second modification example.

FIG. 7 is a graph showing a detection current with respect to PWM control in a second modification example. FIG. 7 corresponds to the phase θ2 of FIG. 2. In addition, for example, one cycle of the carrier signal Cs in FIG. 7 is a period from a time te4 to a time te16.

In FIG. 7, the pulse generation part 442 regards the U-phase as the largest phase, regards the W-phase as the smallest phase, and regards the V-phase as the intermediate phase. When there are two smallest phases in the second modification example, similar to the first constitutive example, the pulse generation part 442 regards one of the two smallest phases as the intermediate phase and regards the other as the smallest phase, thereby generating the PWM pulses (Sx, Sy, and Sz). In addition, when there are two largest phases in the second modification example, similar to the first constitutive example, the pulse generation part 442 regards one of the two largest phases as the intermediate phase and regards the other as the largest phase, thereby generating the PWM pulses (Sx, Sy, and Sz).

When the PWM pulse Sx of the U-phase (largest phase) is generated, the pulse generation part 442 causes the time of starting the high level period of the PWM pulse Sx to become a time te10 of ending the rising period TLup of the carrier signal Cs, in each cycle of the carrier signal Cs. Moreover, the pulse generation part 442 causes the duration of the high level period of the PWM pulse Sx to become the same as the duration TLa1 from a starting time te9 to an ending time te11 of the period during which the carrier signal Cs exceeds the U-phase voltage command Vu_ref (largest phase voltage command).

In addition, when the PWM pulse Sz of the W-phase (smallest phase) is generated, the pulse generation part 442 causes the time of starting the high level period of the PWM pulse Sz to become the time te4 of starting the rising period TLup of the carrier signal Cs, in each cycle of the carrier signal Cs. Moreover, the pulse generation part 442 causes the duration of the high level period of the PWM pulse Sz to become the same as the duration of the period during which the carrier signal Cs exceeds the W-phase voltage command Vw_ref (smallest phase voltage command). For example, twice the duration TLc1 from a time te5 to the time te10 (period during which the carrier signal Cs exceeds the W-phase voltage command Vw_ref (smallest phase voltage command) during the rising period TLup) is regarded as the duration of the high level period of the PWM pulse Sz.

Next, regarding the PWM pulse Sy of the V-phase (intermediate phase), based on a result in which the V-phase voltage command Vv_ref is compared to the carrier signal Cs by the comparing part 441, the pulse generation part 442 generates the PWM pulses (Sv and Sy) of the V-phase (intermediate phase) and particularly generates the PWM pulse Sy as the third PWM pulse. Here, the V-phase is an intermediate phase having a phase voltage command value, of the phase voltage commands (Vu_ref, Vv_ref, and Vw_ref), smaller than that of the voltage command Vu_ref of the U-phase (largest phase) and larger than that of the voltage command Vw_ref of the W-phase (smallest phase). The V-phase voltage command Vv_ref is an intermediate phase voltage command for the V-phase (intermediate phase). At this time, in each cycle of the carrier signal Cs, the pulse generation part 442 regards a time of ending the third level period during which the PWM pulse Sy (third PWM pulse) is at a high level (level for turning on the lower arm switching element 34y for the V-phase (intermediate phase)) as a time te13. Here, the time te13 is a time after a duration (0.5×TLdown) (seventh duration that is half the falling period TLdown) has elapsed from the time te10 of starting the falling period TLdown of the carrier signal Cs. That is, the duration (0.5×TLdown) (seventh duration) is an example of "a seventh duration" of the disclosure. Moreover, in each cycle of the carrier signal Cs, the pulse generation part 442 causes the duration of the third level period to become the same as twice a duration TLb2 (eighth duration). That is, the duration TLb2 is an example of "an eighth duration" of the disclosure. Here, the duration TLb2 (eighth duration) is a duration of the period during which the carrier signal Cs exceeds the V-phase voltage command Vv_ref (intermediate phase voltage command) during the falling period TLdown immediately before the rising period TLup.

For example, in each cycle of the carrier signal Cs, the pulse generation part 442 regards a time of ending the high level period of the PWM pulse Sy as the time te13 that is a time after a duration (0.5×TLdow) (half the falling period TLdown of the carrier signal Cs) has elapsed from the time te10 of ending the rising period TLup of the carrier signal Cs. Moreover, the pulse generation part 442 causes the duration of the high level period of the PWM pulse Sy to become approximately the same as the duration of the period during which the carrier signal Cs exceeds the V-phase voltage command Vv_ref. Regarding the duration of the high level period of the PWM pulse Sy, for example, twice the duration TLb2 from a time te1 to a time te2 (period during which the carrier signal Cs exceeds the V-phase voltage command Vv_ref (intermediate phase voltage command) during the falling period TLdown immediately before the rising period TLup) in FIG. 7 can be employed. When twice the duration TLb2 is employed, a time te8 of starting the high level period of the PWM pulse Sy can be a time after a duration {(TLup+0.5×TLdown)−2×TLb2} obtained by subtracting twice the duration TLb2 from the sum of the rising period TLup and half the falling period TLdown has elapsed from the time te4 of starting the rising period TLup. Accordingly, the pulse generation part 442 turns on the lower arm switching element 34y for the V-phase (intermediate phase) during a period from the time te8 to a time te13 (high level period of the PWM pulse Sy).

Consequently, the high level period of the PWM pulse Sy can be adjusted without changing the duty ratio of the PWM pulse Sy from the duty ratio necessary to realize the phase voltage Vv of the V-phase (intermediate phase in the phase θ2 of FIG. 2). In addition, the time of ending the high level period of the PWM pulse Sy during which the lower arm switching element 34y of the V-phase (intermediate phase) is turned on can be fixed to the time te13 in the middle of the falling period TLdown in each cycle of the carrier signal Cs.

During a period from the time te4 to the time te16 (one cycle of the carrier signal Cs), the motor drive control device 4 can detect the current value (−Iw) of the W-phase (smallest phase) between the time te4 and the time te8 and between the time te13 and a time te15 using the detection current Idc by generating the PWM pulses Sx, Sy, and Sz as described above. Moreover, the motor drive control device 4 can detect the current value (Iu) of the U-phase (largest phase) between the time te8 and the time te10 using the detection current Idc. The current value (Iv) of the V-phase (intermediate phase) can be calculated using the current values (Iu and −Iw) of the two phases described above. Therefore, the current values (Iu, Iv, and Iw) of the respective phases of a three-phase AC voltage can be detected accurately.

<2-1-3. Third Modification Example of PWM Control in First Constitutive Example>

Figure 8:
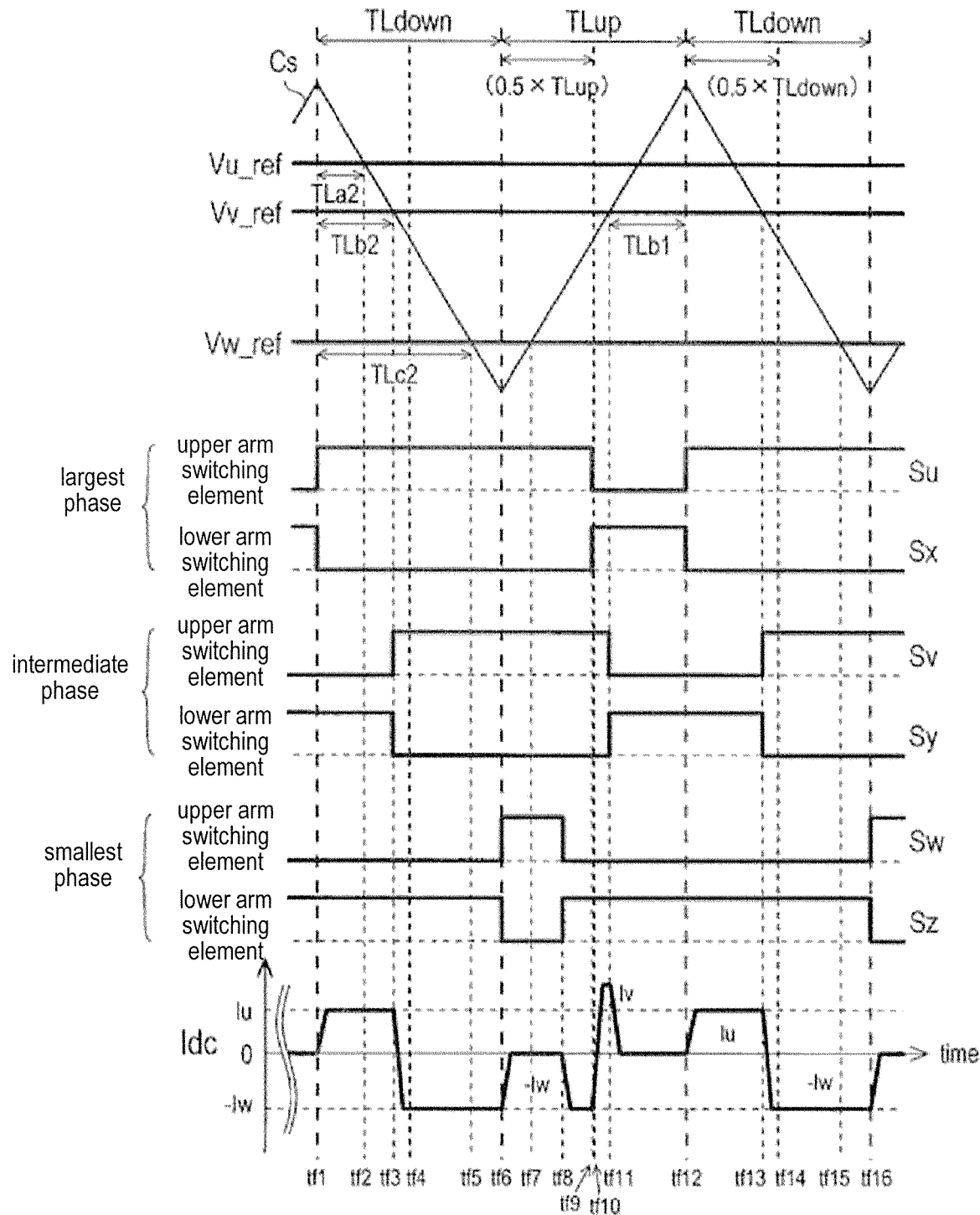
FIG. 8 is a graph showing a detection current with respect to PWM control in a third modification example.

In a third modification example, the PWM pulse of the largest phase is at a low level and the PWM pulse of the smallest phase is at a high level throughout the entire falling period TLdown of the carrier signal. FIG. 8 is a graph showing the detection current Idc with respect to PWM control in the third modification example. FIG. 8 corresponds to the phase θ2 of FIG. 2.

In FIG. 8, the pulse generation part 442 regards the U-phase as the largest phase, regards the W-phase as the smallest phase, and regards the V-phase as the intermediate phase. When there are two smallest phases in the third modification example, similar to the first constitutive example, the pulse generation part 442 regards one of the two smallest phases as the intermediate phase and regards the other as the smallest phase, thereby generating the PWM pulses (Sx, Sy, and Sz). In addition, when there are two largest phases in the third modification example, similar to the first constitutive example, the pulse generation part 442 regards one of the two largest phases as the intermediate phase and regards the other as the largest phase, thereby generating the PWM pulses (Sx, Sy, and Sz).

Regarding the PWM pulse Sx of the U-phase (largest phase), based on a result in which the U-phase voltage command Vu_ref (largest phase voltage command) is compared to the carrier signal Cs by the comparing part 441, the pulse generation part 442 generates the PWM pulses (Su and Sx) of the U-phase (largest phase) and particularly generates the PWM pulse Sx as the first PWM pulse. The PWM pulse Sx is an example of "the first PWM pulse" of the disclosure. At this time, in each cycle of the carrier signal, the pulse generation part 442 causes the duration of the first level period during which the PWM pulse Sx (first PWM pulse) is at a high level (level for turning on the lower arm switching element 34x for the U-phase (largest phase)) to become the same as twice a duration TLa2 (third duration). That is, the duration TLa2 is an example of "the third duration" of the disclosure. Here, the duration TLa2 (third duration) is a duration of the period during which the carrier signal Cs exceeds the U-phase voltage command Vu_ref (largest phase voltage command) during the falling period TLdown immediately before the rising period TLup.

For example, in each cycle of the carrier signal Cs, the pulse generation part 442 regards a time of ending the high level period of the PWM pulse Sx (first PWM pulse) as a time tf12 of ending the rising period TLup of the carrier signal Cs. Moreover, the pulse generation part 442 causes the duration of the high level period of the PWM pulse Sx (first PWM pulse) to become approximately the same as the duration of the period during which the carrier signal Cs exceeds the U-phase voltage command Vu_ref (largest phase voltage command). Regarding the duration of the high level period of the PWM pulse Sx, for example, twice the duration TLa2 from a time tf1 to a time tf2 (period during which the carrier signal Cs exceeds the U-phase voltage command Vu_ref (largest phase voltage command) during the falling period TLdown immediately before the rising period TLup) in FIG. 8 can be employed. When twice the duration TLa2 is employed, a time tf9 of starting the high level period of the PWM pulse Sx (first PWM pulse) can be a time after a duration (TLup−2×TLa2) obtained by subtracting twice the duration TLa2 from the rising period TLup has elapsed from a time tf6 of starting the rising period TLup. Accordingly, in one cycle of the carrier signal Cs, the pulse generation part 442 turns on the lower arm switching element 34x for the U-phase (largest phase) during a period from the time tf9 to the time tf12 (high level period of the PWM pulse Sx).

Consequently, the high level period of the PWM pulse Sx can be adjusted without changing the duty ratio of the PWM pulse Sx from the duty ratio necessary to realize the phase voltage Vu of the U-phase (largest phase in the phase θ2 of FIG. 2). Moreover, during at least the falling period TLdown of the carrier signal Cs, the pulse generation part 442 causes the PWM pulse Sx to be at a low level, such that the lower arm switching element 34x can be turned off.

In addition, regarding the PWM pulse Sz of the W-phase (smallest phase), based on a result in which the W-phase voltage command Vw_ref (smallest phase voltage command) is compared to the carrier signal Cs by the comparing part 441, the pulse generation part 442 generates the PWM pulses (Sw and Sz) of the W-phase (smallest phase) and particularly generates the PWM pulse Sz as the second PWM pulse. The PWM pulse Sz is an example of "the second PWM pulse" of the disclosure. At this time, in each cycle of the carrier signal Cs, the pulse generation part 442 causes the duration of the second level period during which the PWM pulse Sz (second PWM pulse) is at a high level (level for turning on the lower arm switching element 34z for the W-phase (smallest phase)) to become the same as twice a duration TLc2 (fourth duration). That is, the duration TLc2 is an example of "a fourth duration" of the disclosure. Here, the duration TLc2 (fourth duration) is a duration of the period during which the carrier signal Cs exceeds the W-phase voltage command Vw_ref (smallest phase voltage command) during the falling period TLdown immediately before the rising period TLup.

For example, in each cycle of the carrier signal Cs, the pulse generation part 442 regards a time of ending the high level period of the PWM pulse Sz (second PWM pulse) as a time tf16 of ending the falling period TLdown of the carrier signal Cs. Moreover, the pulse generation part 442 causes the duration of the high level period of the PWM pulse Sz to become approximately the same as the duration of the period during which the carrier signal Cs exceeds the W-phase voltage command Vw_ref (smallest phase voltage command). Regarding the duration of the high level period of the PWM pulse Sz, for example, twice the duration TLc2 from the time tf1 to a time tf5 (period during which the carrier signal Cs exceeds the W-phase voltage command Vw_ref (smallest phase voltage command) during the falling period TLdown immediately before the rising period TLup) in FIG. 8 can be employed. When twice the duration TLc2 is employed, a time tf8 of starting the high level period of the PWM pulse Sz can be a time after a duration {(TLup+TLdown)−2×TLc2} obtained by subtracting twice the duration TLc2 from the sum of the rising period TLup and the falling period TLdown has elapsed from the time tf6 of starting the rising period TLup. Accordingly, the pulse generation part 442 turns on the lower arm switching element 34z for the smallest phase during a period from the time tf8 to the time tf16 (high level period of the PWM pulse Sz).

Consequently, the high level period of the PWM pulse Sz can be adjusted without changing the duty ratio of the PWM pulse Sz from the duty ratio necessary to realize the phase voltage Vw of the W-phase (smallest phase in the phase θ2 of FIG. 2). Moreover, throughout at least the entire falling period TLdown of the carrier signal Cs, the pulse generation part 442 can turn on the lower arm switching element 34z of the W-phase (smallest phase).

In addition, when the PWM pulse Sy of the V-phase (intermediate phase) is generated, in each cycle of the carrier signal Cs, the pulse generation part 442 in FIG. 8 regards a period from a starting time tf11 to an ending time tf13 during which the carrier signal Cs exceeds the V-phase voltage command Vv_ref (intermediate phase voltage command) as the high level period of the PWM pulse Sy.

During a period from the time tf5 to the time tf16 (one cycle of the carrier signal Cs), the motor drive control device 4 can detect the current value (−Iw) of the W-phase (smallest phase) between the time tf6 and the time tf8 and between a time tf14 and the time tf16 using the detection current Idc by generating the PWM pulses (Sx, Sy, and Sz) as described above. Moreover, the motor drive control device 4 can detect the current value (Iv) of the V-phase (intermediate phase) between a time tf10 and the time tf11 and can detect the current value (Iu) of the U-phase (largest phase) between the time tf12 and the time tf13 using the detection current Idc. Therefore, the current values (Iu, Iv, and Iw) of the respective phases of a three-phase AC voltage can be detected accurately.

The high level period of the PWM pulse Sy is not limited to the example in FIG. 8. For example, similar to the first modification example, in each cycle of the carrier signal Cs, the pulse generation part 442 may regard the time of starting the high level period of the PWM pulse Sy as the time tf10 after the duration (0.5×TLup) (half the rising period TLup) has elapsed from the time tf6 of starting the rising period TLup of the carrier signal Cs. At this time, the pulse generation part 442 causes the duration of the high level period of the PWM pulse Sy to become approximately the same as the duration of the period during which the carrier signal Cs exceeds the V-phase voltage command Vv_ref. Regarding the duration of the high level period of the PWM pulse Sy, for example, twice the duration TLb1 from the time tf11 to the time tf12 (period during which the carrier signal Cs exceeds the V-phase voltage command Vv_ref (intermediate phase voltage command) during the rising period TLup) can be employed. Accordingly, the pulse generation part 442 turns on the lower arm switching element 34y of the V-phase (intermediate phase) during the high level period of the PWM pulse Sy. Consequently, the high level period of the PWM pulse Sy can be adjusted without changing the duty ratio of the PWM pulse Sy from the duty ratio necessary to realize the phase voltage Vv of the V-phase (intermediate phase in the phase θ2 of FIG. 2). In addition, the time of starting the high level period of the PWM pulse Sy during which the lower arm switching element 34y of the V-phase (intermediate phase) is turned on can be fixed to the time tf10 in the middle of the rising period TLup in each cycle of the carrier signal Cs.

Alternatively, similar to the second modification example, in each cycle of the carrier signal Cs, the pulse generation part 442 may regard the time of ending the high level period of the PWM pulse Sy as the time tf14 after the duration (0.5×TLdown) (half the falling period TLdown of the carrier signal Cs) has elapsed from the time tf12 of ending the rising period TLup of the carrier signal Cs. At this time, the pulse generation part 442 causes the duration of the high level period of the PWM pulse Sy to become approximately the same as the duration of the period during which the carrier signal Cs exceeds the V-phase voltage command Vv_ref. Regarding the duration of the high level period of the PWM pulse Sy, for example, twice the duration TLb2 from the time tf1 to a time tf3 (period during which the carrier signal Cs exceeds the V-phase voltage command Vv_ref (intermediate phase voltage command) during the falling period TLdown immediately before the rising period TLup) in FIG. 8 can be employed. Accordingly, the pulse generation part 442 turns on the lower arm switching element 34y for the intermediate phase during the high level period of the PWM pulse Sy. Consequently, the high level period of the PWM pulse Sy can be adjusted without changing the duty ratio of the PWM pulse Sy from the duty ratio necessary to realize the phase voltage Vv of the V-phase (intermediate phase in the phase θ2 of FIG. 2).

In addition, the time of ending the high level period of the PWM pulse Sy during which the lower arm switching element 34y of the V-phase (intermediate phase) is turned on is fixed to the time tf14 in the middle of the falling period TLdown in each cycle of the carrier signal Cs. Therefore, as in FIG. 8, when the PWM pulse Sx of the U-phase (largest phase) is at a low level and the PWM pulse Sz of the W-phase (smallest phase) is at a high level throughout the entire falling period TLdown, the current value (Iu) of the U-phase (largest phase) can be detected during the first half of the falling period TLdown, and the current value (−Iw) of the W-phase (smallest phase) during the latter half of the falling period TLdown can be detected. That is, it is possible to fix the period during which the current value (Iu) of the U-phase (largest phase) can be detected and the period during which the current value (−Iw) of the W-phase (smallest phase) can be detected. Therefore, accurate current values of the respective phases of a three-phase AC voltage can be detected more quickly and more easily.

<2-1-4. Fourth Modification Example of PWM Control in First Constitutive Example>

Figure 9:
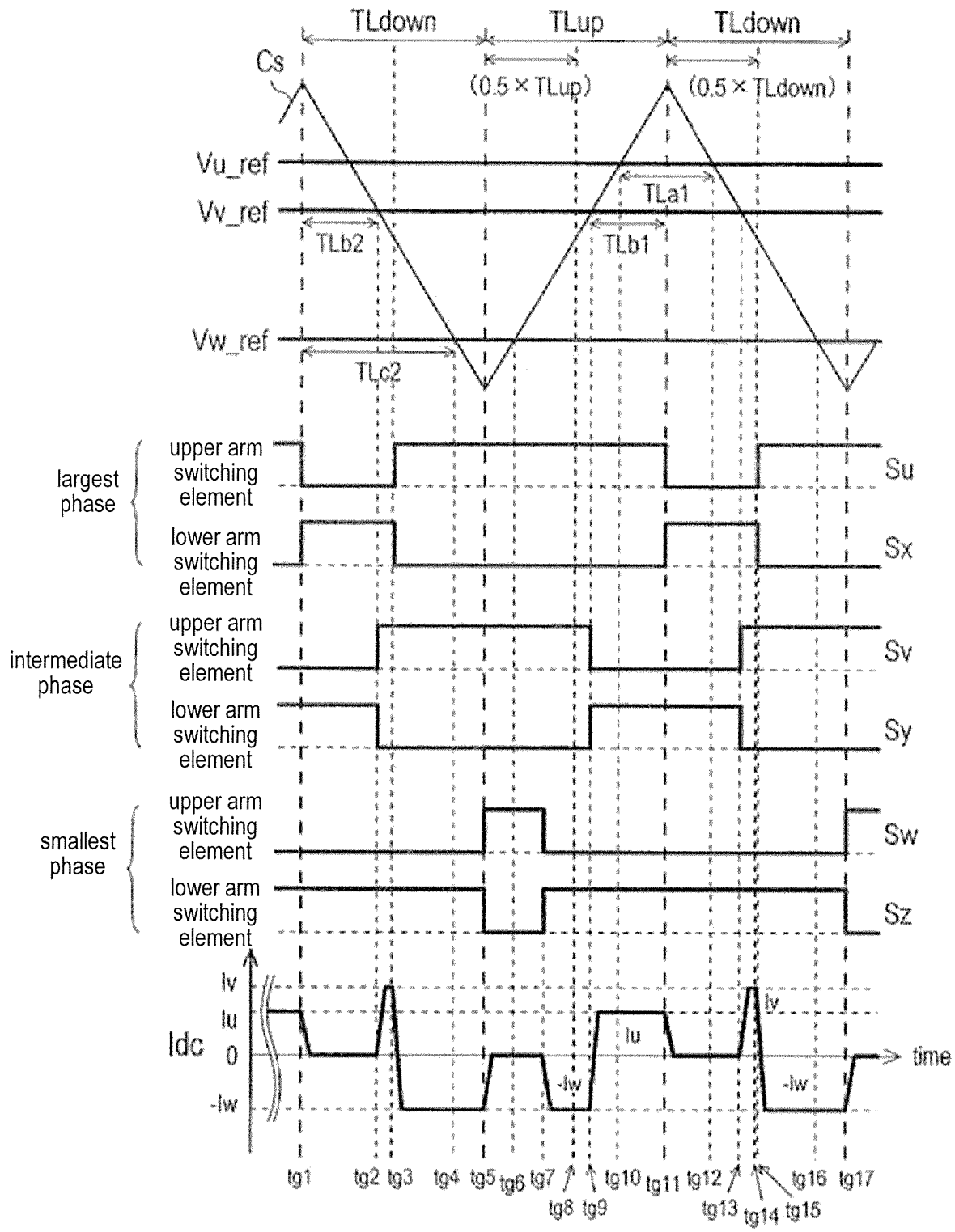
FIG. 9 is a graph showing a detection current with respect to PWM control in a fourth modification example.

In a fourth modification example, the PWM pulse of the largest phase is at a low level throughout the entire rising period TLup of the carrier signal, and the PWM pulse of the smallest phase is at a high level throughout the entire falling period TLdown of the carrier signal. FIG. 9 is a graph showing the detection current Idc with respect to PWM control in the fourth modification example. FIG. 9 corresponds to the phase θ2 of FIG. 2.

In FIG. 9, the pulse generation part 442 regards the U-phase as the largest phase, regards the W-phase as the smallest phase, and regards the V-phase as the intermediate phase. When there are two smallest phases in the fourth modification example, similar to the first constitutive example, the pulse generation part 442 regards one of the two smallest phases as the intermediate phase and regards the other as the smallest phase, thereby generating the PWM pulses (Sx, Sy, and Sz). In addition, when there are two largest phases in the fourth modification example, similar to the first constitutive example, the pulse generation part 442 regards one of the two largest phases as the intermediate phase and regards the other as the largest phase, thereby generating the PWM pulses (Sx, Sy, and Sz).

Regarding the PWM pulse Sx of the U-phase (largest phase), based on a result in which the U-phase voltage command Vu_ref (largest phase voltage command) is compared to the carrier signal Cs by the comparing part 441, the pulse generation part 442 generates the PWM pulses (Su and Sx) of the U-phase (largest phase) and particularly generates the PWM pulse Sx as the first PWM pulse. The PWM pulse Sx is an example of "the first PWM pulse" of the disclosure. At this time, in each cycle of the carrier signal Cs, the pulse generation part 442 causes the duration of the first level period during which the PWM pulse Sx (first PWM pulse) is at a high level (level for turning on the lower arm switching element 34x for the U-phase (largest phase)) to become the same as the duration TLa1 (first duration). That is, the duration TLa1 is an example of "the first duration" of the disclosure. Here, the duration TLa1 (first duration) is a duration of the period during which the carrier signal Cs exceeds the U-phase voltage command Vu_ref (largest phase voltage command).

For example, in each cycle of the carrier signal Cs, the pulse generation part 442 regards the time of starting the high level period of the PWM pulse Sx as a time tg11 of ending the rising period TLup of the carrier signal Cs. Moreover, the pulse generation part 442 causes the duration of the high level period of the PWM pulse Sx to become the same as the duration TLa1 from a time tg10 of starting the period during which the carrier signal Cs exceeds the U-phase voltage command Vu_ref (largest phase voltage command) to a time tg12 of ending the foregoing period. Accordingly, during a period from a time tg5 to a time tg17 (one cycle of the carrier signal Cs), the pulse generation part 442 turns on the lower arm switching element 34x for the U-phase (largest phase) during a period from the time tg11 to a time tg14 (high level period of the PWM pulse Sx).

Consequently, the high level period of the PWM pulse Sx can be adjusted without changing the duty ratio of the PWM pulse Sx from the duty ratio necessary to realize the phase voltage Vu of the U-phase (largest phase in the phase θ2 of FIG. 2). Moreover, during at least the rising period TLup of the carrier signal Cs, the pulse generation part 442 causes the PWM pulse Sx to be at a low level, such that the lower arm switching element 34x can be turned off.

In addition, regarding the PWM pulse Sz of the W-phase (smallest phase), based on a result in which the W-phase voltage command Vw_ref (smallest phase voltage command) is compared to the carrier signal Cs by the comparing part 441, the pulse generation part 442 generates the PWM pulses (Sw and Sz) of the W-phase (smallest phase) and particularly generates the PWM pulse Sz as the second PWM pulse. The PWM pulse Sz is an example of "the second PWM pulse" of the disclosure. At this time, in each cycle of the carrier signal Cs, the pulse generation part 442 causes the duration of the second level period during which the PWM pulse Sz (second PWM pulse) is at a high level (level for turning on the lower arm switching element 34z for the W-phase (smallest phase)) to become the same as twice the duration TLc2 (fourth duration). That is, the duration TLc2 is an example of "the fourth duration" of the disclosure. Here, the duration TLc2 (fourth duration) is a duration of the period during which the carrier signal Cs exceeds the W-phase voltage command Vw_ref (smallest phase voltage command) during the falling period TLdown immediately before the rising period TLup.

For example, in each cycle of the carrier signal Cs, the pulse generation part 442 regards the time of ending the high level period of the PWM pulse Sz as the time tg17 of ending the falling period TLdown of the carrier signal Cs. Moreover, the pulse generation part 442 causes the duration of the high level period of the PWM pulse Sz to become approximately the same as the duration of the period during which the carrier signal Cs exceeds the W-phase voltage command Vw_ref (smallest phase voltage command). Regarding the duration of the high level period of the PWM pulse Sz, for example, twice the duration TLc2 from a time tg1 to a time tg4 (period during which the carrier signal Cs exceeds the W-phase voltage command Vw_ref (smallest phase voltage command) during the falling period TLdown immediately before the rising period TLup) in FIG. 9 can be employed. When twice the duration TLc2 is employed, a time tg7 of starting the high level period of the PWM pulse Sz can be a time after the duration {(TLup+TLdown)−2×TLc2} obtained by subtracting twice the duration TLc2 from the sum of the rising period TLup and the falling period TLdown has elapsed from the time tg5 of starting the rising period TLup. Accordingly, the pulse generation part 442 turns on the lower arm switching element 34z for the W-phase (smallest phase) during a period from the time tg7 to the time tg17 (high level period of the PWM pulse Sz).

Consequently, the high level period of the PWM pulse Sz can be adjusted without changing the duty ratio of the PWM pulse Sz from the duty ratio necessary to realize the phase voltage Vw of the W-phase (smallest phase in the phase θ2 of FIG. 2). Moreover, throughout at least the entire falling period TLdown of the carrier signal Cs, the pulse generation part 442 can turn on the lower arm switching element 34z of the W-phase (smallest phase).

In addition, when the PWM pulse Sy of the V-phase (intermediate phase) is generated, in each cycle of the carrier signal Cs, the pulse generation part 442 in FIG. 9 regards a period from a starting time tg9 to an ending time tg13 during which the carrier signal Cs exceeds the V-phase voltage command Vv_ref (intermediate phase voltage command) as the high level period of the PWM pulse Sy.

During a period from the time tg5 to the time tg17 (one cycle of the carrier signal Cs), the motor drive control device 4 can detect the current value (−Iw) of the W-phase (smallest phase) between the time tg7 and the time tg9 and between the time tg14 and the time tg17 using the detection current Idc by generating the PWM pulses Sx, Sy, and Sz as described above.

Moreover, the motor drive control device 4 can detect the current value (Iu) of the U-phase (largest phase) between the time tg9 and the time tg11 and can detect the current value (Iv) of the V-phase (intermediate phase) between the time tg13 and the time tg14 using the detection current Idc. Therefore, the current values (Iu, Iv, and Iw) of the respective phases of a three-phase AC voltage can be detected accurately.

The high level period of the PWM pulse Sy is not limited to the example in FIG. 9. For example, similar to the first modification example, in each cycle of the carrier signal Cs, the pulse generation part 442 may regard the time of starting the high level period of the PWM pulse Sy as a time tg8 after the duration (0.5×TLup) (half the rising period TLup) has elapsed from the time tg5 of starting the rising period TLup of the carrier signal Cs. At this time, the pulse generation part 442 causes the duration of the high level period of the PWM pulse Sy to become approximately the same as the duration of the period during which the carrier signal Cs exceeds the V-phase voltage command Vv_ref. Regarding the duration of the high level period of the PWM pulse Sy, for example, twice the duration TLb1 from the time tg9 to the time tg11 (period during which the carrier signal Cs exceeds the V-phase voltage command Vv_ref (intermediate phase voltage command) during the rising period TLup) can be employed. Accordingly, the pulse generation part 442 turns on the lower arm switching element 34$y$ for the intermediate phase during the high level period of the PWM pulse Sy. Consequently, the high level period of the PWM pulse Sy can be adjusted without changing the duty ratio of the PWM pulse Sy from the duty ratio necessary to realize the phase voltage Vv of the V-phase (intermediate phase in the phase θ2 of FIG. 2). In addition, the time of starting the high level period of the PWM pulse Sy during which the lower arm switching element 34$y$ of the V-phase (intermediate phase) is turned on can be fixed to the time tg8 in the middle of the rising period TLup in each cycle of the carrier signal Cs.

Alternatively, similar to the second modification example, in each cycle of the carrier signal Cs, the pulse generation part 442 may regard the time of ending the high level period of the PWM pulse Sy as a time tg15 after the duration (0.5×TLdown) (half the falling period TLdown of the carrier signal Cs) has elapsed from the time tg11 of ending the rising period TLup of the carrier signal Cs. At this time, the pulse generation part 442 causes the duration of the high level period of the PWM pulse Sy to become approximately the same as the duration of the period during which the carrier signal Cs exceeds the V-phase voltage command Vv_ref. Regarding the duration of the high level period of the PWM pulse Sy, for example, twice the duration TLb2 from the time tg1 to a time tg2 (period during which the carrier signal Cs exceeds the V-phase voltage command Vv_ref (intermediate phase voltage command) during the falling period TLdown immediately before the rising period TLup) in FIG. 9 can be employed. Accordingly, the pulse generation part 442 turns on the lower arm switching element 34$y$ for the intermediate phase during the high level period of the PWM pulse Sy. Consequently, the high level period of the PWM pulse Sy can be adjusted without changing the duty ratio of the PWM pulse Sy from the duty ratio necessary to realize the phase voltage Vv of the V-phase (intermediate phase in the phase θ2 of FIG. 2). In addition, the time of ending the high level period of the PWM pulse Sy during which the lower arm switching element 34$y$ of the V-phase (intermediate phase) is turned on can be fixed to the time tg15 in the middle of the falling period TLdown in each cycle of the carrier signal Cs.

<2-1-5. Fifth Modification Example of PWM Control in First Constitutive Example>

Figure 10:
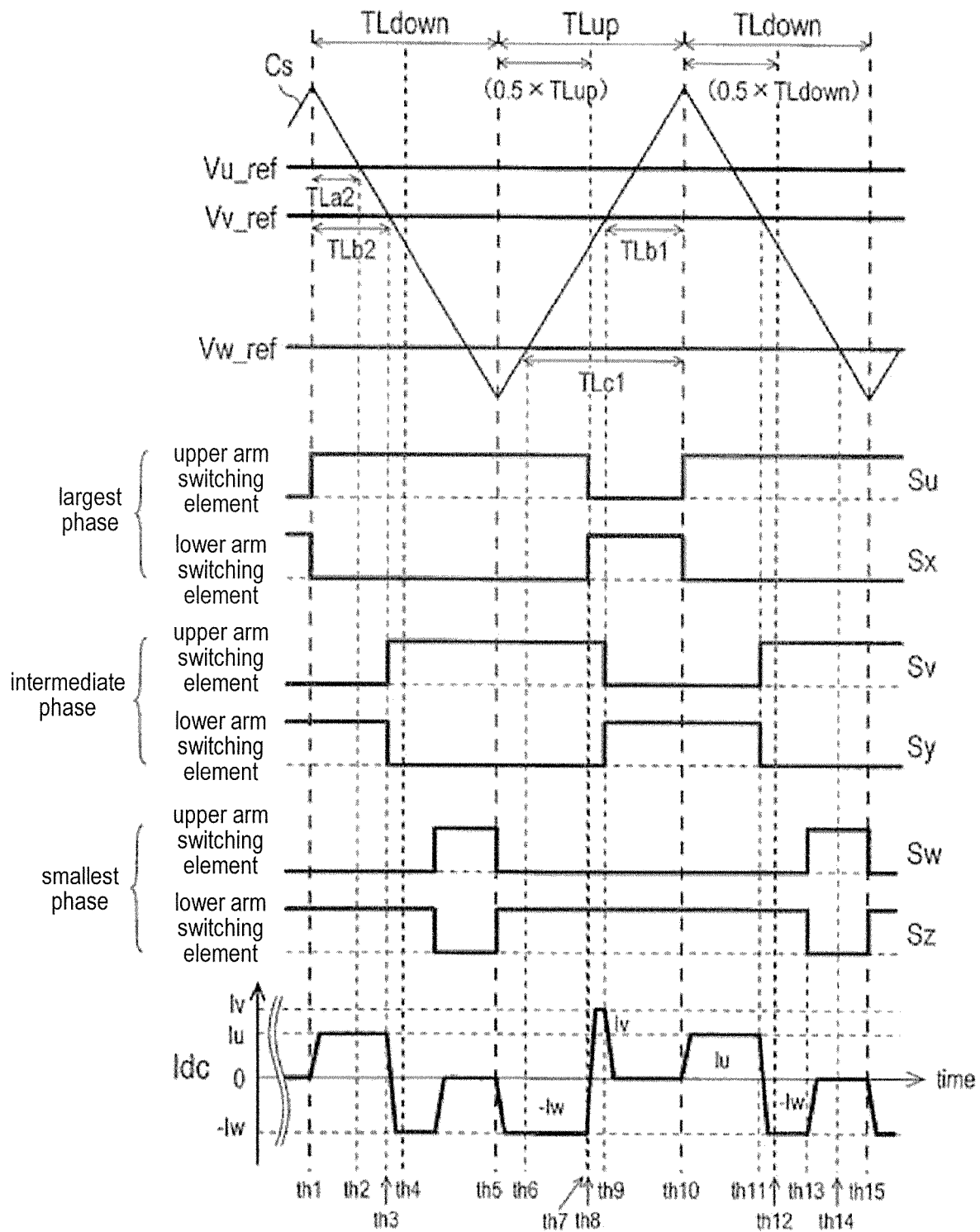
FIG. 10 is a graph showing a detection current with respect to PWM control in a fifth modification example.

In a fifth modification example, the PWM pulse of the largest phase is at a low level throughout the entire falling period TLdown of the carrier signal, and the PWM pulse of the smallest phase is at a high level throughout the entire rising period TLup of the carrier signal. FIG. 10 is a graph showing the detection current Idc with respect to PWM control in the fifth modification example. FIG. 10 corresponds to the phase θ2 of FIG. 2.

In FIG. 10, the pulse generation part 442 regards the U-phase as the largest phase, regards the W-phase as the smallest phase, and regards the V-phase as the intermediate phase. When there are two smallest phases in the fifth modification example, similar to the first constitutive example, the pulse generation part 442 regards one of the two smallest phases as the intermediate phase and regards the other as the smallest phase, thereby generating the PWM pulses (Sx, Sy, and Sz). In addition, when there are two largest phases in the fifth modification example, similar to the first constitutive example, the pulse generation part 442 regards one of the two largest phases as the intermediate phase and regards the other as the largest phase, thereby generating the PWM pulses (Sx, Sy, and Sz).

Regarding the PWM pulse Sx of the U-phase (largest phase), based on a result in which the U-phase voltage command Vu_ref (largest phase voltage command) is compared to the carrier signal Cs by the comparing part 441, the pulse generation part 442 generates the PWM pulses (Su and Sx) of the U-phase (largest phase) and particularly generates the PWM pulse Sx as the first PWM pulse. At this time, in each cycle of the carrier signal Cs, the pulse generation part 442 causes the duration of the first level period during which the PWM pulse Sx (first PWM pulse) is at a high level (level for turning on the lower arm switching element 34$x$ for the U-phase (largest phase)) to become the same as twice the duration TLa2 (third duration). That is, the duration TLa2 is an example of "the third duration" of the disclosure. Here, the duration TLa2 (third duration) is a duration of the period during which the carrier signal Cs exceeds the U-phase voltage command Vu_ref (largest phase voltage command) during the falling period TLdown immediately before the rising period TLup.

For example, in each cycle of the carrier signal Cs, the pulse generation part 442 regards the time of ending the high level period of the PWM pulse Sx as a time th10 of ending the rising period TLup of the carrier signal Cs. Moreover, the pulse generation part 442 causes the duration of the high level period of the PWM pulse Sx to become approximately the same as a duration of the period during which the carrier signal Cs exceeds the U-phase voltage command Vu_ref (largest phase voltage command). Regarding the duration of the high level period of the PWM pulse Sx, for example, twice the duration TLa2 from a time th1 to a time th2 (period during which the carrier signal Cs exceeds the U-phase voltage command Vu_ref (largest phase voltage command) during the falling period TLdown immediately before the rising period TLup) in FIG. 10 can be employed. When twice the duration TLa2 is employed, a time th7 of starting the high level period of the PWM pulse Sx can be a time after the duration (TLup−2×TLa2) obtained by subtracting twice the duration TLa2 from the rising period TLup has elapsed from a time th5 of starting the rising period TLup. Accordingly, during a period from the time th5 to a time th15 (one cycle of the carrier signal Cs), the pulse generation part 442 turns on the lower arm switching element 34$x$ for the U-phase (largest phase) during a period from the time th7 to the time th10 (high level period of the PWM pulse Sx).

Consequently, the high level period of the PWM pulse Sx can be adjusted without changing the duty ratio of the PWM pulse Sx from the duty ratio necessary to realize the phase voltage Vu of the U-phase (largest phase in the phase θ2 of FIG. 2). Moreover, during at least the falling period TLdown of the carrier signal Cs, the pulse generation part 442 causes the PWM pulse Sx to be at a low level, such that the lower arm switching element 34x can be turned off.

In addition, regarding the PWM pulse Sz of the W-phase (smallest phase), based on a result in which the W-phase voltage command Vw_ref (smallest phase voltage command) is compared to the carrier signal Cs by the comparing part 441, the pulse generation part 442 generates the PWM pulses (Sw and Sz) of the W-phase (smallest phase) and particularly generates the PWM pulse Sz as the second PWM pulse. The PWM pulse Sz is an example of "the second PWM pulse" of the disclosure. At this time, in each cycle of the carrier signal Cs, the pulse generation part 442 causes the duration of the second level period during which the PWM pulse Sz (second PWM pulse) is at a high level (level for turning on the lower arm switching element 34z for the W-phase (smallest phase)) to become the same as twice the duration TLc1 (second duration). That is, the duration TLc1 is an example of "the second duration" of the disclosure. Here, the duration TLc1 (second duration) is a duration of the period during which the carrier signal Cs exceeds the W-phase voltage command Vw_ref (smallest phase voltage command) during the rising period TLup.

For example, in each cycle of the carrier signal Cs, the pulse generation part 442 regards the time of starting the high level period of the PWM pulse Sz as the time th5 of starting the rising period TLup of the carrier signal Cs. Moreover, the pulse generation part 442 causes the duration of the high level period of the PWM pulse Sz to become the same as the duration of the period during which the carrier signal Cs exceeds the W-phase voltage command Vw_ref (smallest phase voltage command). Regarding the duration of the period during which the carrier signal Cs exceeds the W-phase voltage command Vw_ref (smallest phase voltage command), for example, twice the duration TLc1 from a time th6 to the time th10 (period during which the carrier signal Cs exceeds the W-phase voltage command Vw_ref (smallest phase voltage command) during the rising period TLup) can be employed. Accordingly, the pulse generation part 442 turns on the lower arm switching element 34z for the W-phase (smallest phase) during a period from the time th5 to a time th13 (high level period of the PWM pulse Sz).

Consequently, the high level period of the PWM pulse Sz can be adjusted without changing the duty ratio of the PWM pulse Sz from the duty ratio necessary to realize the phase voltage Vw of the W-phase (smallest phase in the phase θ2 of FIG. 2). Moreover, throughout at least the entire rising period TLup of the carrier signal Cs, the pulse generation part 442 can turn on the lower arm switching element 34z of the W-phase (smallest phase).

In addition, when the PWM pulse Sy of the V-phase (intermediate phase) is generated, in each cycle of the carrier signal Cs, the pulse generation part 442 in FIG. 10 regards a period from a starting time th9 to an ending time th11 during which the carrier signal Cs exceeds the V-phase voltage command Vv_ref (intermediate phase voltage command) as the high level period of the PWM pulse Sy.

During a period from the time th5 to the time th15 (one cycle of the carrier signal Cs), the motor drive control device 4 can detect the current value (−Iw) of the W-phase (smallest phase) between the time th5 and the time th7 and between the time th11 and the time th13 using the detection current Idc by generating the PWM pulses Sx, Sy, and Sz as described above. Moreover, the motor drive control device 4 can detect the current value (Iv) of the V-phase (intermediate phase) between a time th8 and the time th9 and can detect the current value (Iu) of the U-phase (largest phase) between the time th10 and the time th11 using the detection current Idc. Therefore, the current values (Iu, Iv, and Iw) of the respective phases of a three-phase AC voltage can be detected accurately.

The high level period of the PWM pulse Sy is not limited to the example in FIG. 10. For example, similar to the first modification example, in each cycle of the carrier signal Cs, the pulse generation part 442 may regard the time of starting the high level period of the PWM pulse Sy as the time th8 after the duration (0.5×TLup) (half the rising period TLup) has elapsed from the time th5 of starting the rising period TLup of the carrier signal Cs. At this time, the pulse generation part 442 causes the duration of the high level period of the PWM pulse Sy to become approximately the same as the duration of the period during which the carrier signal Cs exceeds the V-phase voltage command Vv_ref. Regarding the duration of the high level period of the PWM pulse Sy, for example, twice the duration TLb1 from the time th6 to the time th10 (period during which the carrier signal Cs exceeds the V-phase voltage command Vv_ref (intermediate phase voltage command) during the rising period TLup) can be employed. Accordingly, the pulse generation part 442 turns on the lower arm switching element 34y for the intermediate phase during the high level period of the PWM pulse Sy. Consequently, the high level period of the PWM pulse Sy can be adjusted without changing the duty ratio of the PWM pulse Sy from the duty ratio necessary to realize the phase voltage Vv of the V-phase (intermediate phase in the phase θ2 of FIG. 2). In addition, the time of starting the high level period of the PWM pulse Sy during which the lower arm switching element 34y of the V-phase (intermediate phase) is turned on can be fixed to the time th8 in the middle of the rising period TLup in each cycle of the carrier signal Cs.

Alternatively, similar to the second modification example, in each cycle of the carrier signal Cs, the pulse generation part 442 may regard the time of ending the high level period of the PWM pulse Sy as a time th12 after the duration (0.5×TLdown) (half the falling period TLdown of the carrier signal Cs) has elapsed from the time th10 of ending the rising period TLup of the carrier signal Cs. At this time, the pulse generation part 442 causes the duration of the high level period of the PWM pulse Sy to become approximately the same as the duration of the period during which the carrier signal Cs exceeds the V-phase voltage command Vv_ref. Regarding the duration of the high level period of the PWM pulse Sy, for example, twice the duration TLb2 from the time th1 to a time th3 (period during which the carrier signal Cs exceeds the V-phase voltage command Vv_ref (intermediate phase voltage command) during the falling period TLdown immediately before the rising period TLup) in FIG. 10 can be employed. Accordingly, the pulse generation part 442 turns on the lower arm switching element 34y for the intermediate phase during the high level period of the PWM pulse Sy. Consequently, the high level period of the PWM pulse Sy can be adjusted without changing the duty ratio of the PWM pulse Sy from the duty ratio necessary to realize the phase voltage Vv of the V-phase (intermediate phase in the phase θ2 of FIG. 2). In addition, the time of ending the high level period of the PWM pulse Sy during which the lower arm switching element 34y of the V-phase (intermediate phase) is turned on can be fixed to the time th12 in the middle of the falling period TLdown in each cycle of the carrier signal Cs.

<2-2. Second Constitution of PWM Control Part>

Figure 11:
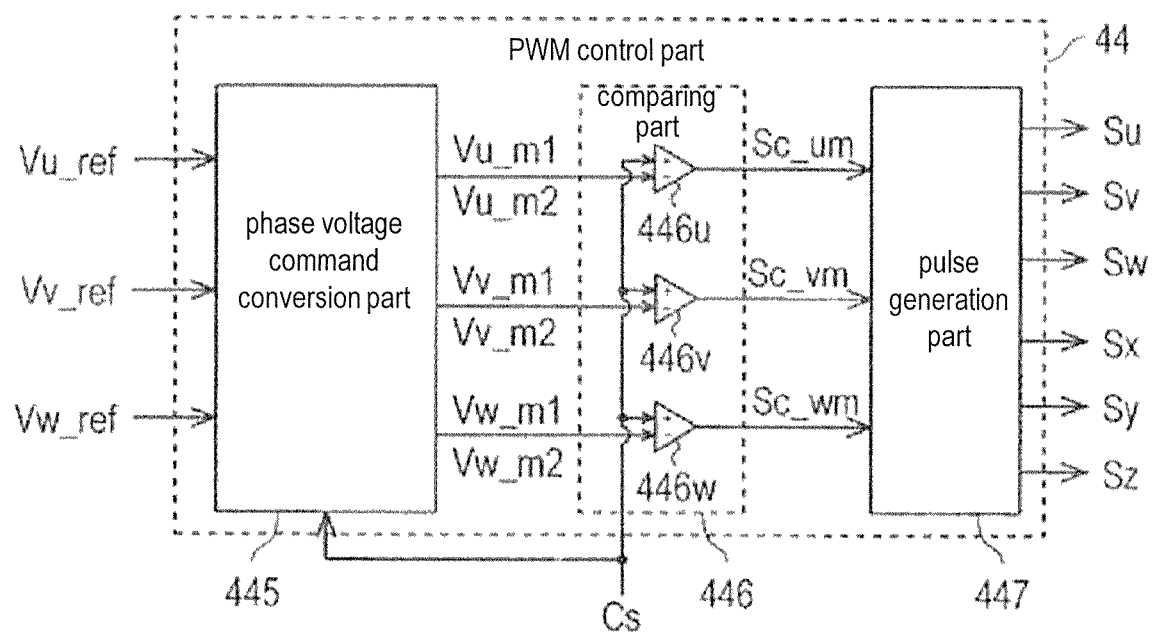
FIG. 11 is a block diagram illustrating a second constitutive example of the PWM control part.

Next, a second constitutive example of the PWM control part 44 will be described. FIG. 11 is a block diagram illustrating the second constitutive example of the PWM control part 44. As illustrated in FIG. 11, the PWM control part 44 has a phase voltage command conversion part 445, a comparing part 446, and a pulse generation part 447.

The phase voltage command conversion part 445 converts the phase voltage commands Vu_ref, Vv_ref, and Vw_ref into first phase voltage commands Vu_m1, Vv_m1, and Vw_m1 and second phase voltage commands Vu_m2, Vv_m2, and Vw_m2 using the carrier signal Cs.

More specifically, the phase voltage command conversion part 445 regards a phase, of the respective phases of a three-phase AC voltage, having the largest phase voltage command value as the largest phase, regards a phase having the smallest phase voltage command value as the smallest phase, and regards a phase having a phase voltage command value smaller than that of the largest phase and larger than that of the smallest phase as the intermediate phase. When there are two phases having the largest phase voltage command value, the phase voltage command conversion part 445 regards one of the two phases having the largest phase voltage command value as the largest phase and regards the other as the intermediate phase. In addition, when there are two phases having the smallest phase voltage command value, the phase voltage command conversion part 445 regards one of the two phases having the smallest phase voltage command value as the smallest phase and regards the other as the intermediate phase. Hereinafter, for easier understanding of the contents, a case where the U-phase is the largest phase, the W-phase is the smallest phase, and the V-phase is the intermediate phase will be described.

The phase voltage command conversion part 445 converts the U-phase voltage command Vu_ref (largest phase voltage command throughout the entire first period) into the first U-phase voltage command Vu_m1. Here, the first period is one of the rising period TLup and the falling period TLdown of the carrier signal Cs. The first U-phase voltage command Vu_m1 is a first largest phase voltage command having the same value as the largest value of the carrier signal Cs. Moreover, the phase voltage command conversion part 445 converts the U-phase voltage command Vu_ref (largest phase voltage command throughout the entire third period) into the second U-phase voltage command Vu_m2 (second largest phase voltage command). Here, the third period is the other of the rising period TLup and the falling period TLdown of the carrier signal Cs. The second U-phase voltage command Vu_m2 (second largest phase voltage command) is a value obtained by subtracting the difference between the first largest phase voltage command and the largest phase voltage command (Vu_m1−Vu_ref) from the largest phase voltage command {Vu_ref−(Vu_m1−Vu_ref)}={2×Vu_ref−Vu_m1}.

In addition, the phase voltage command conversion part 445 converts the W-phase voltage command Vw_ref (smallest phase voltage command throughout the entire second period) into the first W-phase voltage command Vw_m1. Here, the second period is one of the rising period TLup and the falling period TLdown of the carrier signal Cs. The first W-phase voltage command Vw_m1 is a first smallest phase voltage command having the same value as the smallest value of the carrier signal Cs. Moreover, the phase voltage command conversion part 445 converts the W-phase voltage command Vw_ref (smallest phase voltage command throughout the entire fourth period) into the second W-phase voltage command Vw_m2 (second smallest phase voltage command). Here, the fourth period is the other of the rising period TLup and the falling period TLdown of the carrier signal Cs. The second W-phase voltage command Vw_m2 (second smallest phase voltage command) is a value obtained by adding the difference between the first smallest phase voltage command and the smallest phase voltage command (Vw_ref−Vw_m1) to the smallest phase voltage command {Vw_ref−k(Vw_ref−Vw_m1)}={2×Vw_ref−Vw_m1}.

In addition, the phase voltage command conversion part 445 converts the V-phase voltage command Vv_ref into the first V-phase voltage command Vv_m1 throughout the entire fifth period. Here, the fifth period is one of the rising period TLup and the falling period TLdown of the carrier signal Cs. The first V-phase voltage command Vv_m1 is a first intermediate phase voltage command having the same value as the average value of the largest value and the smallest value of the carrier signal Cs. Moreover, the phase voltage command conversion part 445 converts the V-phase voltage command Vv_ref (intermediate phase voltage command throughout the entire sixth period) into the second V-phase voltage command Vv_m2 (second intermediate phase voltage command). Here, the sixth period is the other of the rising period TLup and the falling period TLdown of the carrier signal Cs. At this time, when the first V-phase voltage command Vv_m1 (first intermediate phase voltage command) is smaller than the V-phase voltage command Vv_ref (intermediate phase voltage command), the phase voltage command conversion part 445 causes the second V-phase voltage command Vv_m2 (second intermediate phase voltage command) to become a value obtained by adding the difference between the intermediate phase voltage command and the first intermediate phase voltage command (Vv_ref−Vv_m1) to the intermediate phase voltage command {Vv_ref−k(Vv_ref−Vv_m1)}. On the other hand, when the first V-phase voltage command Vv_m1 (first intermediate phase voltage command) is equal to larger than the V-phase voltage command Vv_ref (intermediate phase voltage command), the phase voltage command conversion part 445 causes the second V-phase voltage command Vv_m2 (second intermediate phase voltage command) to become a value obtained by subtracting the difference between the intermediate phase voltage command and the first intermediate phase voltage command (Vv_m1−Vv_ref) from the intermediate phase voltage command {Vv_ref−(Vv_m1−Vv_ref)}={2×Vv_ref−Vv_m1}.

The comparing part 446 compares the carrier signal Cs to the first phase voltage commands Vu_m1, Vv_m1, and Vw_m1 and the second phase voltage commands Vu_m2, Vv_m2, and Vw_m2. More specifically, the comparing part 441 has a comparator 446*u*, a comparator 446*v*, and a comparator 446*w*.

The comparator 446*u* compares the carrier signal Cs to the first U-phase voltage command Vu_m1 and the second U-phase voltage command Vu_m2 and outputs a signal Sc_um to the pulse generation part 447 as a comparison result thereof. The comparator 446*v* compares the carrier signal Cs to the first V-phase voltage command Vv_m1 and the second V-phase voltage command Vv_m2 and outputs a signal Sc_vm to the pulse generation part 447 as a comparison result thereof. The comparator 446*w* compares the carrier signal Cs to the first W-phase voltage command Vw_m1 and the second W-phase voltage command Vw_m2 and outputs a signal Sc_wm to the pulse generation part 447 as a comparison result thereof.

The pulse generation part 447 generates the PWM pulses (Su, Sv, Sw, Sx, Sy, and Sz) based on the comparison results of the comparing part 446. More specifically, in each cycle of the carrier signal Cs, the pulse generation part 447 generates the PWM pulses (Su and Sx) and particularly generates the PWM pulse Sx as the first PWM pulse based on the results in which the carrier signal Cs is compared to the first U-phase voltage command Vu_m1 (first largest phase voltage command) and the second U-phase voltage command Vu_m2 (second largest phase voltage command) by the comparing part 446. At this time, the pulse generation part 447 causes the PWM pulse Sx (first PWM pulse) to be at a high level (level for turning on the lower arm switching element 34x for the U-phase (largest phase)) during a period during which the carrier signal Cs exceeds the first U-phase voltage command Vu_m1 (first largest phase voltage command) or the second U-phase voltage command Vu_m2 (second largest phase voltage command).

Consequently, the lower arm switching element 34x of the U-phase (largest phase) can be turned off by causing the PWM pulse Sx to be at a low level throughout the entire first period (one of the rising period TLup and the falling period TLdown of the carrier signal Cs) without changing the duty ratio of the PWM pulse Sx from the duty ratio necessary to realize the phase voltage Vu of the U-phase (largest phase in the phase θ2 of FIG. 2).

In addition, in each cycle of the carrier signal Cs, the pulse generation part 447 generates the PWM pulses (Sw and Sz) and particularly generates the PWM pulse Sz as the second PWM pulse based on the results in which the carrier signal Cs is compared to the first W-phase voltage command Vw_m1 (first smallest phase voltage command) and the second W-phase voltage command Vw_m2 (second smallest phase voltage command) by the comparing part 446. At this time, the pulse generation part 447 causes the PWM pulse Sz (second PWM pulse) to be at a high level (level for turning on the lower arm switching element 34z for the W-phase (smallest phase)) during a period during which the carrier signal Cs exceeds the first V-phase voltage command Vw_m1 (first smallest phase voltage command) or the second V-phase voltage command Vw_m2 (second smallest phase voltage command).

Consequently, the lower arm switching element 34z of the W-phase (smallest phase) can be turned on by causing the PWM pulse Sz to be at a high level throughout the entire second period (one of the rising period TLup and the falling period TLdown of the carrier signal Cs) without changing the duty ratio of the PWM pulse Sz from the duty ratio necessary to realize the phase voltage Vw of the W-phase (smallest phase in the phase θ2 of FIG. 2).

In addition, in each cycle of the carrier signal Cs, the pulse generation part 447 generates the PWM pulses (Sv and Sy) and particularly generates the PWM pulse Sy as the third PWM pulse based on the results in which the carrier signal Cs is compared to the first V-phase voltage command Vv_m1 (first intermediate phase voltage command) and the second V-phase voltage command Vv_m2 (second intermediate phase voltage command) by the comparing part 446. At this time, the pulse generation part 447 causes the PWM pulse Sy (third PWM pulse) to be at a high level (level for turning on the lower arm switching element 34y for the V-phase (intermediate phase)) during a period during which the carrier signal Cs exceeds the first intermediate phase voltage command Vv_m1 or the second intermediate phase voltage command Vv_m2.

Consequently, in each cycle of the carrier signal Cs, the time of starting the high level period of the PWM pulse Sy during which the lower arm switching element 34y of the V-phase (intermediate phase) is turned on can be fixed in the middle of the fifth period (one of the rising period TLup and the falling period TLdown). Therefore, for example, when the PWM pulse Sx is at a low level and the PWM pulse Sz is at a high level throughout the entire rising period TLup, the current value (−Iw) of the W-phase (smallest phase) can be detected during the first half of the rising period TLup by starting the high level period of the PWM pulse Sy in the middle of the rising period TLup. Moreover, the current value (Iu) of the U-phase (largest phase) can be detected during the latter half of the rising period TLup. In addition, for example, when the PWM pulse Sx is at a low level and the PWM pulse Sz is at a high level throughout the entire falling period TLdown, the current value (−Iw) of the W-phase (smallest phase) can be detected during the first half of the falling period TLdown by starting the high level period of the PWM pulse Sy in the middle of the falling period TLdown. Moreover, the current value (Iu) of the U-phase (largest phase) can be detected during the latter half of the falling period TLdown. That is, during the fifth period, the period during which the current value (Iu) of the U-phase (largest phase) can be detected and the period during which the current value (−Iw) of the W-phase (smallest phase) can be detected do not change. Therefore, the accurate current values (Iu, Iv, and Iw) of the respective phases of a three-phase AC voltage can be detected more quickly and more easily. Moreover, the high level period of the PWM pulse Sy can be adjusted without changing the duty ratio of the PWM pulse based on the V-phase voltage command Vv_ref (intermediate phase voltage command) from the duty ratio necessary to realize the phase voltage Vv of the V-phase (intermediate phase in each of the phases θ of FIG. 2).

<2-2-1. PWM Control in Second Constitutive Example>

Figure 12:
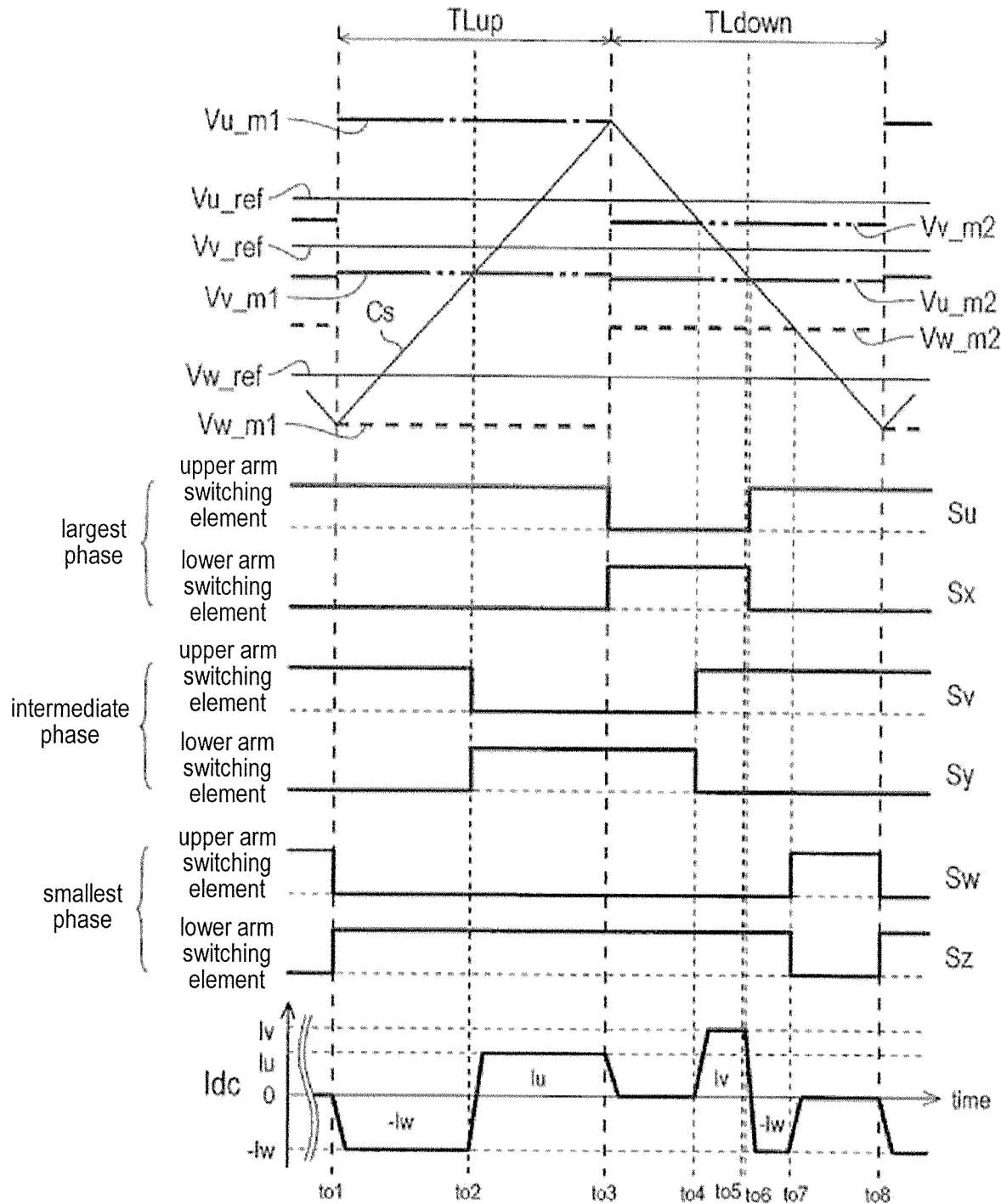
FIG. 12 is a graph showing a detection current with respect to PWM control in the second constitutive example.

Next, an example of PWM control in the second constitutive example will be described. FIG. 12 is a graph showing the detection current Idc with respect to PWM control in the second constitutive example. FIG. 12 corresponds to the phase θ2 of FIG. 2.

Hereinafter, in order to facilitate understanding, the dead times between the PWM pulses (Su, Sv, and Sw) of the upper arm switching elements (34u, 34v, and 34w) and the PWM pulses (Sx, Sy, and Sz) of the lower arm switching elements (34x, 34y, and 34z) will be omitted. In this case, the waveforms of the PWM pulses (Su, Sv, and Sw) become waveforms in which the positive poles and the negative poles of the respective PWM pulses (Sx, Sy, and Sz) are inverted. Therefore, the high level period of the PWM pulses (Su, Sv, and Sw) becomes the low level period of the PWM pulses (Sx, Sy, and Sz), and the low level period of the PWM pulses (Su, Sv, and Sw) becomes the high level period of the PWM pulses (Sx, Sy, and Sz). Thus, hereinafter, description of the PWM pulses (Su, Sv, and Sw) may be omitted.

First, as in FIG. 12, the phase voltage command conversion part 445 converts the U-phase voltage command Vu_ref having the largest phase voltage command value into the first U-phase voltage command Vu_m1 of which the value during the rising period TLup is the same as the largest value of the carrier signal Cs, and the second U-phase voltage command Vu_m2 of which the value during the falling period TLdown is {2×Vu_ref−Vu_m1}. In addition, the phase voltage command conversion part 445 converts the W-phase voltage command Vw_ref having the smallest phase voltage command value into the first W-phase voltage command Vw_m1 of which the value during the rising period TLup is the same as the smallest value of the carrier signal Cs, and the second W-phase voltage command Vw_m2 of which the value during the falling period TLdown is {2×Vw_ref−Vw_m1}. In addition, the phase voltage command conversion part 445 converts the V-phase voltage command Vv_ref having a phase voltage command value smaller than that of the U-phase voltage command Vu_ref and larger than that of the W-phase voltage command Vw_ref into the first V-phase voltage command Vv_m1 of which the value during the rising period TLup is the same as the average value of the largest value and the smallest value of the carrier signal Cs, and the second V-phase voltage command Vv_m2 of which the value during the falling period TLdown is {2×Vv_ref−Vv_m1}.

In each cycle of the carrier signal Cs, the pulse generation part 447 generates the PWM pulses (Su, Sv, Sw, Sx, Sy, and Sz) based on the results in which the carrier signal Cs is compared to the first phase voltage commands (Vu_m1, Vv_m1, and Vw_m1) and the second phase voltage commands (Vu_m2, Vv_m2, and Vw_m2) by the comparing part 446. At this time, the pulse generation part 447 regards a period during which the carrier signal Cs is larger than the first phase voltage commands (Vu_m1, Vv_m1, and Vw_m1) and the second phase voltage commands (Vu_m2, Vv_m2, and Vw_m2) as the high level period of the PWM pulses Sx, Sy, and Sz.

For example, during a period from a time to1 to a time to8 (one cycle of the carrier signal Cs), the pulse generation part 447 causes the PWM pulse Sx to be at a high level and turns on the lower arm switching element 34x of the U-phase (largest phase) during a period from a time to3 to a time to6 in FIG. 12. In addition, the pulse generation part 447 causes the PWM pulse Sx to be at a low level and turns off the lower arm switching element 34x of the U-phase (largest phase) during a period from the time to1 to the time to3 and a period from the time to6 to the time to8 in FIG. 12.

In addition, during the period from the time to1 to the time to8 (one cycle of the carrier signal Cs), the pulse generation part 447 causes the PWM pulse Sz to be at a high level and turns on the lower arm switching element 34z of the W-phase (smallest phase) during a period from the time to1 to a time to7 in FIG. 12. In addition, the pulse generation part 447 causes the PWM pulse Sz to be at a low level and turns off the lower arm switching element 34z of the W-phase (smallest phase) during a period from the time to7 to the time to8 in FIG. 12.

In addition, during the period from the time to1 to the time to8 (one cycle of the carrier signal Cs), the pulse generation part 447 causes the PWM pulse Sy to be at a high level and turns on the lower arm switching element 34y of the V-phase (intermediate phase) during a period from a time to2 to a time to4 in FIG. 12. In addition, the pulse generation part 447 causes the PWM pulse Sy to be at a low level and turns off the lower arm switching element 34y of the V-phase (intermediate phase) during a period from the time to1 to the time to2 and a period from the time to4 to the time to8 in FIG. 12.

In this manner, throughout at least the entire rising period TLup, the pulse generation part 447 causes the PWM pulse Sx to be at a low level, causes the PWM pulse Sz to be at a high level, turns off the lower arm switching element 34x, and turns on the lower arm switching element 34z. Therefore, during the rising period TLup in each cycle of the carrier signal Cs, the detection time for at least the U-phase current Iu and the W-phase current Iw in a three-phase AC voltage can be reliably ensured. The remaining current value (Iv) of the V-phase can be calculated using the current values (Iu and Iw) of the two phases described above. Therefore, the current values (Iu, Iv, and Iw) of the respective phases of a three-phase AC voltage can be detected accurately.

In addition, the pulse generation part 447 can fix the time to2 of starting the high level period of the PWM pulse Sy during which the lower arm switching element 34y of the V-phase (intermediate phase) is turned on in the middle of the rising period TLup in each cycle of the carrier signal Cs.

Therefore, when the PWM pulse Sx is at a low level and the PWM pulse Sz is at a high level throughout the entire rising period TLup as in FIG. 12, the current value (−Iw) of the W-phase (smallest phase) can be detected during the first half of the rising period TLup and the current value (Iu) of the U-phase (largest phase) can be detected during the latter half of the rising period TLup. That is, it is possible to fix the period during which the current value (Iu) of the U-phase (largest phase) can be detected and the period during which the current value (−Iw) of the W-phase (smallest phase) can be detected. Therefore, accurate current values of the respective phases of a three-phase AC voltage can be detected more quickly and more easily.

The embodiment is not limited to the example in FIG. 12. The phase voltage commands (Vu_ref, Vv_ref, and Vw_ref) may be converted into the first phase voltage commands (Vu_m1, Vv_m1, and Vw_m1) of which the values during the falling period TLdown are the same as the largest value of the carrier signal Cs, and the second phase voltage commands (Vu_m2, Vv_m2, and Vw_m2) of which the values during the rising period TLup are {2×Vu_ref−Vu_m1}, {2×Vv_ref−Vv_m1}, and {2×Vw_ref−Vw_m1}. Consequently, during the falling period TLdown in each cycle of the carrier signal Cs, the detection time for phase currents of at least two phases (for example, the U-phase and the W-phase) in a three-phase AC voltage can be reliably ensured.

Further, the U-phase voltage command Vu_ref (largest phase voltage command) may be converted into the first U-phase voltage command Vu_m1 (first largest phase voltage command) of which the value during the falling period TLdown is the same as the largest value of the carrier signal Cs, and the second U-phase voltage command Vu_m2 having the value of {2×Vu_ref−Vu_m1} that is the second largest phase voltage command of which the value during the rising period TLup is a value obtained by subtracting the first largest phase voltage command from twice the largest phase voltage command. Moreover, the W-phase voltage command Vw_ref (smallest phase voltage command) may be converted into the first W-phase voltage command Vw_m1 (first smallest phase voltage command) of which the value during the rising period TLup is the same as the smallest value of the carrier signal Cs, and the second W-phase voltage command Vw_m2 having the value of {2×Vw_ref−Vw_m1} that is the second smallest phase voltage command of which the value during the falling period TLdown is a value obtained by subtracting the first smallest phase voltage command from twice the smallest phase voltage command. In this manner as well, in each cycle of the carrier signal Cs, the current values (Iu, Iv, and Iw) of the respective phases of a three-phase AC voltage can be detected accurately.

In addition, the V-phase voltage command Vv_ref (intermediate phase voltage command) may be converted into the first V-phase voltage command Vv_m1 (first intermediate phase voltage command) of which the value during the falling period TLdown is the same as the average value of the largest value and the smallest value of the carrier signal Cs, and the second V-phase voltage command Vv_m2 (second intermediate phase voltage command) of which the value during the rising period TLup is {2×Vv_ref−Vv_m1}. Consequently, the time of starting the high level period of the PWM pulse Sy during which the lower arm switching element 34y of the V-phase (intermediate phase) is turned on can be fixed in the middle of the falling period TLdown in each cycle of the carrier signal Cs. Therefore, when the PWM pulse Sx is at a low level and the PWM pulse Sz is at a high level throughout the entire falling period TLdown, the current value (Iu) of the U-phase (largest phase) can be detected during the first half of the falling period TLdown, and the current value (−Iw) of the W-phase (smallest phase) can be detected during the latter half of the falling period TLdown. That is, it is possible to fix the period during which the current value (Iu) of the U-phase (largest phase) can be detected and the period during which the current value (−Iw) of the W-phase (smallest phase) can be detected. Therefore, accurate current values of the respective phases of a three-phase AC voltage can be detected more quickly and more easily.

Alternatively, the first V-phase voltage command Vv_m1 (first intermediate phase voltage command) and the second V-phase voltage command Vv_m2 (second intermediate phase voltage command) may be the same values as the V-phase voltage command Vv_ref (intermediate phase voltage command).

2. Supplement

Hereinabove, an embodiment of the disclosure has been described. However, the scope of the disclosure is not limited thereto and the embodiment can be performed by adding various changes within a range not departing from the gist of the disclosure. In addition, the foregoing embodiment and the modification examples thereof can be combined suitably and arbitrarily.

For example, in the embodiment described above, the upper arm switching elements (34u, 34v, and 34w) and the lower arm switching elements (34x, 34y, and 34z) are normally-off-type switching elements. That is, these are electrified and turned on when the PWM pulses (Su, Sv, Sw, Sx, Sy, and Sz) at a high level are applied. However, the embodiment is not limited to this example. At least a part of the upper arm switching elements (34u, 34v, and 34w) and the lower arm switching elements (34x, 34y, and 34z) is a normally-off-type switching element. That is, at least a part of the upper arm switching elements (34u, 34v, and 34w) and the lower arm switching elements (34x, 34y, and 34z) may be electrified and turned on when the PWM pulses (Su, Sv, Sw, Sx, Sy, and Sz) at a low level are applied.

INDUSTRIAL APPLICABILITY

The disclosure is useful for a device detecting current values of respective phases of a three-phase AC voltage of a PWM inverter.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A motor drive control device which controls driving of a motor using a PWM inverter outputting a three-phase AC voltage to the motor and detects current values of respective phases of the three-phase AC voltage by controlling turning on-off of an upper arm switching element and a lower arm switching element of the PWM inverter using a PWM pulse, the motor drive control device comprising:
   a phase voltage command part which outputs phase voltage commands for the respective phases of the three-phase AC voltage; and
   a PWM control part which generates the PWM pulse based on a carrier signal cyclically repeating rising and falling and the phase voltage commands,
   wherein the PWM control part
      generates a first PWM pulse based on a largest phase voltage command, of the phase voltage commands, for a largest phase having a largest phase voltage command value, and the carrier signal, and causes the first PWM pulse to be at a level for turning off the lower arm switching element for the largest phase throughout an entire first period that is one of a rising period and a falling period of the carrier signal; and
      generates a second PWM pulse based on a smallest phase voltage command, of the phase voltage commands, for a smallest phase having a smallest phase voltage command value, and the carrier signal, and causes the second PWM pulse to be at a level for turning on the lower arm switching element for the smallest phase throughout an entire second period that is one of the rising period and the falling period of the carrier signal.

2. The motor drive control device according to claim 1, wherein the PWM control part has
   a comparing part comparing the carrier signal to the phase voltage commands, and
   a pulse generation part generating the PWM pulse based on comparison results of the comparing part, and
   wherein the pulse generation part
      generates the first PWM pulse based on a result in which the largest phase voltage command and the carrier signal are compared to each other by the comparing part, and causes a duration of a first level period during which the first PWM pulse is at a level for turning on the lower arm switching element for the largest phase to become the same as a first duration of a period during which the carrier signal exceeds the largest phase voltage command, in each cycle of the carrier signal; and
      generates the second PWM pulse based on a result in which the smallest phase voltage command and the carrier signal are compared to each other by the comparing part, and causes a duration of a second level period during which the second PWM pulse is at a level for turning on the lower arm switching element for the smallest phase to become the same as twice a second duration of a period during which the carrier signal exceeds the smallest phase voltage command during the rising period, in each cycle of the carrier signal.

3. The motor drive control device according to claim 1, wherein the PWM control part has
   a comparing part comparing the carrier signal to the phase voltage commands, and
   a pulse generation part generating the PWM pulse based on comparison results of the comparing part, and
   wherein the pulse generation part
      generates the first PWM pulse based on a result in which the largest phase voltage command and the carrier signal are compared to each other by the comparing part, and causes a duration of a first level period during which the first PWM pulse is at a level for turning on the lower arm switching element for the largest phase to become the same as twice a third duration of a period during which the carrier signal exceeds the largest phase voltage command during the falling period immediately before the rising period, in each cycle of the carrier signal; and generates the second PWM pulse based on a result in which the smallest phase voltage command and the carrier signal are compared to each other by the comparing part, and causes a duration of a second level period during which the second PWM pulse is at a level for turning on the lower arm switching element for the smallest phase to become the same as twice a fourth duration of a period during which the carrier signal exceeds the smallest phase voltage command during the falling period immediately before the rising period, in each cycle of the carrier signal.

4. The motor drive control device according to claim 1, wherein the PWM control part has a comparing part comparing the carrier signal to the phase voltage commands, and a pulse generation part generating the PWM pulse based on comparison results of the comparing part, and wherein the pulse generation part generates the first PWM pulse based on a result in which the largest phase voltage command and the carrier signal are compared to each other by the comparing part, and causes a duration of a first level period during which the first PWM pulse is at a level for turning on the lower arm switching element for the largest phase to become the same as a first duration of a period during which the carrier signal exceeds the largest phase voltage command, in each cycle of the carrier signal; and generates the second PWM pulse based on a result in which the smallest phase voltage command and the carrier signal are compared to each other by the comparing part, and causes a duration of a second level period during which the second PWM pulse is at a level for turning on the lower arm switching element for the smallest phase to become the same as twice a fourth duration of a period during which the carrier signal exceeds the smallest phase voltage command during the falling period immediately before the rising period, in each cycle of the carrier signal.

5. The motor drive control device according to claim 1, wherein the PWM control part has a comparing part comparing the carrier signal to the phase voltage commands, and a pulse generation part generating the PWM pulse based on comparison results of the comparing part, and wherein the pulse generation part generates the first PWM pulse based on a result in which the largest phase voltage command and the carrier signal are compared to each other by the comparing part, and causes a duration of a first level period during which the first PWM pulse is at a level for turning on the lower arm switching element for the largest phase to become the same as twice a third duration of a period during which the carrier signal exceeds the largest phase voltage command during the falling period immediately before the rising period, in each cycle of the carrier signal; and generates the second PWM pulse based on a result in which the smallest phase voltage command and the carrier signal are compared to each other by the comparing part, and causes a duration of a second level period during which the second PWM pulse is at a level for turning on the lower arm switching element for the smallest phase to become the same as twice a second duration of a period during which the carrier signal exceeds the smallest phase voltage command during the rising period, in each cycle of the carrier signal.

6. The motor drive control device according to claim 1, wherein the PWM control part has a phase voltage command conversion part converting the phase voltage commands into a first phase voltage command and a second phase voltage command using the carrier signal, a comparing part comparing the carrier signal to the first phase voltage command and the second phase voltage command, and a pulse generation part generating the PWM pulse based on comparison results of the comparing part, wherein the phase voltage command conversion part converts the largest phase voltage command throughout the entire first period that is one of the rising period and the falling period of the carrier signal into a first largest phase voltage command having the same value as a largest value of the carrier signal, and converts the largest phase voltage command throughout an entire third period that is the other of the rising period and the falling period of the carrier signal into a second largest phase voltage command having a value obtained by subtracting a difference between the first largest phase voltage command and the largest phase voltage command from the largest phase voltage command; and converts the smallest phase voltage command throughout the entire second period that is one of the rising period and the falling period of the carrier signal into a first smallest phase voltage command having the same value as a smallest value of the carrier signal, and converts the smallest phase voltage command throughout an entire fourth period that is the other of the rising period and the falling period of the carrier signal into a second smallest phase voltage command having a value obtained by adding a difference between the first smallest phase voltage command and the smallest phase voltage command to the smallest phase voltage command, and wherein in each cycle of the carrier signal, the pulse generation part generates the first PWM pulse based on a result in which the carrier signal is compared to the first largest phase voltage command and the second largest phase voltage command by the comparing part, and causes the first PWM pulse to be at a level for turning on the lower arm switching element for the largest phase during a period during which the carrier signal exceeds the first largest phase voltage command or the second largest phase voltage command; and generates the second PWM pulse based on a result in which the carrier signal is compared to the first smallest phase voltage command and the second smallest phase voltage command by the comparing part, and causes the second PWM pulse to be at a level for turning on the lower arm switching element for the smallest phase during a period during which the carrier signal exceeds the first smallest phase voltage command or the second smallest phase voltage command.

7. The motor drive control device according to claim 2, wherein the pulse generation part
   generates a third PWM pulse based on a result in which an intermediate phase voltage command, of the phase voltage commands, for an intermediate phase having a phase voltage command value smaller than the phase voltage command value of the largest phase voltage command and larger than the phase voltage command value of the smallest phase voltage command, is compared to the carrier signal by the comparing part; and
   causes a time of starting a third level period during which the third PWM pulse is at a level for turning on the lower arm switching element for the intermediate phase to become a time after a fifth duration that is half the rising period has elapsed from a time of starting the rising period of the carrier signal, and causes a duration of the third level period to become the same as twice a sixth duration, in each cycle of the carrier signal, and
   wherein the sixth duration is a duration of a period during which the carrier signal exceeds the intermediate phase voltage command during the rising period.

8. The motor drive control device according to claim 1, wherein the pulse generation part
   generates a third PWM pulse based on a result in which an intermediate phase voltage command, of the phase voltage commands, for an intermediate phase having a phase voltage command value smaller than the phase voltage command value of the largest phase voltage command and larger than the phase voltage command value of the smallest phase voltage command, is compared to the carrier signal by the comparing part, and
   causes a time of ending a third level period during which the third PWM pulse is at a level for turning on the lower arm switching element for the intermediate phase to become a time after a seventh duration that is half the falling period has elapsed from a time of starting the falling period of the carrier signal, and causes a duration of the third level period to become the same as twice an eighth duration, in each cycle of the carrier signal, and
   wherein the eighth duration is a duration of a period during which the carrier signal exceeds the intermediate phase voltage command during the falling period immediately before the rising period.

9. The motor drive control device according to claim 6, wherein the phase voltage command conversion part
   converts the intermediate phase voltage command into a first intermediate phase voltage command having the same value as an average value of a largest value and a smallest value of the carrier signal throughout an entire fifth period that is one of the rising period and the falling period of the carrier signal,
   converts the intermediate phase voltage command into a second intermediate phase voltage command throughout an entire sixth period that is the other of the rising period and the falling period of the carrier signal,
   causes the second intermediate phase voltage command to have a value obtained by adding a difference between the intermediate phase voltage command and the first intermediate phase voltage command to the intermediate phase voltage command when the first intermediate phase voltage command is smaller than the intermediate phase voltage command, and
   causes the second intermediate phase voltage command to have a value obtained by subtracting the difference between the intermediate phase voltage command and the first intermediate phase voltage command from the intermediate phase voltage command when the first intermediate phase voltage command is equal to or larger than the intermediate phase voltage command, and
   wherein in each cycle of the carrier signal, the pulse generation part
   generates a third PWM pulse based on a result in which the carrier signal is compared to the first intermediate phase voltage command and the second intermediate phase voltage command by the comparing part, and causes the third PWM pulse to be at a level for turning on the lower arm switching element for the intermediate phase during a period during which the carrier signal exceeds the first intermediate phase voltage command or the second intermediate phase voltage command.

10. The motor drive control device according to claim 7, wherein when the phase voltage commands include two smallest phase voltage commands, the PWM control part
    generates the second PWM pulse based on one of the two smallest phase voltage commands and the carrier signal, and
    generates the third PWM pulse based on the other of the two smallest phase voltage commands and the carrier signal.

11. The motor drive control device according to claim 7, wherein when the phase voltage commands include two largest phase voltage commands, the PWM control part
    generates the first PWM pulse based on one of the two largest phase voltage commands and the carrier signal, and
    generates the third PWM pulse based on the other of the two largest phase voltage commands and the carrier signal.

12. A motor system comprising:
    a motor to which a three-phase AC voltage is applied by a PWM inverter; and
    the motor drive control device according to claim 1 which controls driving of the motor using the PWM inverter and detects current values of respective phases of the three-phase AC voltage by controlling turning on-off of an upper arm switching element and a lower arm switching element of the PWM inverter using a PWM pulse.

13. An air blowing device comprising:
    an impeller which has a vane rotatable about a central axis extending in an up-down direction;
    a motor which rotates the vane;
    a PWM inverter which outputs a three-phase AC voltage to the motor; and
    the motor drive control device according to claim 1 which controls driving of the motor using the PWM inverter and detects current values of respective phases of the three-phase AC voltage by controlling turning on-off of an upper arm switching element and a lower arm switching element of the PWM inverter using a PWM pulse.

* * * * *